(12) United States Patent
Johnson

(10) Patent No.: US 12,328,480 B2
(45) Date of Patent: *Jun. 10, 2025

(54) CROWDSOURCING SUPPLEMENTAL CONTENT

(71) Applicant: Comcast Cable Communications, LLC, Philadelphia, PA (US)

(72) Inventor: Derek Johnson, Sedalia, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 131 days.

This patent is subject to a terminal disclaimer.

(21) Appl. No.: 17/461,564

(22) Filed: Aug. 30, 2021

(65) Prior Publication Data
US 2022/0232289 A1  Jul. 21, 2022

Related U.S. Application Data

(63) Continuation of application No. 13/671,626, filed on Nov. 8, 2012, now Pat. No. 11,115,722.

(51) Int. Cl.
| | |
|---|---|
| G06F 15/16 | (2006.01) |
| G06F 16/40 | (2019.01) |
| H04N 21/41 | (2011.01) |
| H04N 21/478 | (2011.01) |
| H04N 21/4784 | (2011.01) |
| H04N 21/4788 | (2011.01) |

(Continued)

(52) U.S. Cl.
CPC ......... *H04N 21/4788* (2013.01); *G06F 16/40* (2019.01); *H04N 21/41265* (2020.08); *H04N 21/47815* (2013.01); *H04N 21/4784* (2013.01);

*H04N 21/84* (2013.01); *H04N 21/8547* (2013.01); *G06F 16/60* (2019.01)

(58) Field of Classification Search
None
See application file for complete search history.

(56) References Cited

U.S. PATENT DOCUMENTS

| | | |
|---|---|---|
| 5,287,489 A | 2/1994 | Nimmo et al. |
| 5,321,750 A | 6/1994 | Nadan |

(Continued)

FOREIGN PATENT DOCUMENTS

| | | |
|---|---|---|
| EP | 0624039 A2 | 11/1994 |
| EP | 0963115 A1 | 12/1999 |

(Continued)

OTHER PUBLICATIONS

U.S. Appl. No. 10/306,752, Broadcast Database, filed Nov. 27, 2002.

(Continued)

*Primary Examiner* — Alex Gofman
(74) *Attorney, Agent, or Firm* — Banner & Witcoff, Ltd.

(57) ABSTRACT

Methods and systems for sourcing supplemental content are disclosed. Secondary devices may be used to identify content streaming on first screen devices and to generate supplemental data for the content. In this manner, users may be leveraged to create various data for a variety of content. The data may be collected and organized so that users watching content at a later time may have access to the data. Methods and systems for using second screen devices to access metadata created by the crowd are also disclosed.

24 Claims, 11 Drawing Sheets

(51) Int. Cl.
*H04N 21/84* (2011.01)
*H04N 21/8547* (2011.01)
*G06F 16/60* (2019.01)

(56) References Cited

U.S. PATENT DOCUMENTS

| | | | |
|---|---|---|---|
| 5,353,121 A | 10/1994 | Young et al. |
| 5,485,221 A | 1/1996 | Banker et al. |
| 5,521,841 A | 5/1996 | Arman et al. |
| 5,530,939 A | 6/1996 | Mansfield, Jr. et al. |
| 5,583,563 A | 12/1996 | Wanderscheid et al. |
| 5,589,892 A | 12/1996 | Knee et al. |
| 5,592,551 A | 1/1997 | Lett et al. |
| 5,594,509 A | 1/1997 | Florin et al. |
| 5,613,057 A | 3/1997 | Caravel |
| 5,621,456 A | 4/1997 | Florin et al. |
| 5,657,072 A | 8/1997 | Aristides et al. |
| 5,659,793 A | 8/1997 | Escobar et al. |
| 5,666,645 A | 9/1997 | Thomas et al. |
| 5,675,752 A | 10/1997 | Scott et al. |
| 5,694,176 A | 12/1997 | Bruette et al. |
| 5,737,552 A | 4/1998 | Lavallee et al. |
| 5,802,284 A | 9/1998 | Karlton et al. |
| 5,826,102 A | 10/1998 | Escobar et al. |
| 5,844,620 A | 12/1998 | Coleman et al. |
| 5,850,218 A | 12/1998 | LaJoie et al. |
| 5,852,435 A | 12/1998 | Vigneaux et al. |
| 5,860,073 A | 1/1999 | Ferrel et al. |
| 5,883,677 A | 3/1999 | Hofmann |
| 5,892,902 A | 4/1999 | Clark |
| 5,892,905 A | 4/1999 | Brandt et al. |
| 5,905,492 A | 5/1999 | Straub et al. |
| 5,929,849 A | 7/1999 | Kikinis |
| 5,945,987 A | 8/1999 | Dunn |
| 5,960,194 A | 9/1999 | Choy et al. |
| 5,990,890 A | 11/1999 | Etheredge |
| 5,996,025 A | 11/1999 | Day et al. |
| 6,002,394 A | 12/1999 | Schein et al. |
| 6,005,561 A | 12/1999 | Hawkins et al. |
| 6,008,083 A | 12/1999 | Brabazon et al. |
| 6,008,803 A | 12/1999 | Rowe et al. |
| 6,008,836 A | 12/1999 | Bruck et al. |
| 6,016,144 A | 1/2000 | Blonstein et al. |
| 6,025,837 A | 2/2000 | Matthews, III et al. |
| 6,038,560 A | 3/2000 | Wical |
| 6,049,823 A | 4/2000 | Hwang |
| 6,061,695 A | 5/2000 | Slivka et al. |
| 6,067,108 A | 5/2000 | Yokote et al. |
| 6,088,722 A | 7/2000 | Herz et al. |
| 6,091,411 A | 7/2000 | Straub et al. |
| 6,094,237 A | 7/2000 | Hashimoto |
| 6,141,003 A | 10/2000 | Chor et al. |
| 6,148,081 A | 11/2000 | Szymanski et al. |
| 6,162,697 A | 12/2000 | Singh et al. |
| 6,169,543 B1 | 1/2001 | Wehmeyer |
| 6,172,677 B1 | 1/2001 | Stautner et al. |
| 6,177,931 B1 | 1/2001 | Alexander et al. |
| 6,191,781 B1 | 2/2001 | Chaney et al. |
| 6,195,692 B1 | 2/2001 | Hsu |
| 6,205,582 B1 | 3/2001 | Hoarty |
| 6,219,839 B1 | 4/2001 | Sampsell |
| 6,239,795 B1 | 5/2001 | Ulrich et al. |
| 6,240,555 B1 | 5/2001 | Shoff et al. |
| 6,281,940 B1 | 8/2001 | Sciammarella |
| 6,292,187 B1 | 9/2001 | Gibbs et al. |
| 6,292,827 B1 | 9/2001 | Raz |
| 6,295,057 B1 | 9/2001 | Rosin et al. |
| 6,314,569 B1 | 11/2001 | Chernock et al. |
| 6,317,885 B1 | 11/2001 | Fries |
| 6,345,305 B1 | 2/2002 | Beck et al. |
| 6,405,239 B1 | 6/2002 | Addington et al. |
| 6,415,438 B1 | 7/2002 | Blackketter et al. |
| 6,421,067 B1 | 7/2002 | Kamen et al. |
| 6,426,779 B1 | 7/2002 | Noguchi et al. |
| 6,442,755 B1 | 8/2002 | Lemmons et al. |
| 6,477,705 B1 | 11/2002 | Yuen et al. |
| 6,486,920 B2 | 11/2002 | Arai et al. |
| 6,522,342 B1 | 2/2003 | Gagnon et al. |
| 6,529,950 B1 | 3/2003 | Lumelsky et al. |
| 6,530,082 B1 | 3/2003 | Del Sesto et al. |
| 6,532,589 B1 | 3/2003 | Proehl et al. |
| 6,564,263 B1 | 5/2003 | Bergman et al. |
| 6,567,104 B1 | 5/2003 | Andrew et al. |
| 6,571,392 B1 | 5/2003 | Zigmond et al. |
| 6,591,292 B1 | 7/2003 | Morrison et al. |
| 6,621,509 B1 | 9/2003 | Eiref et al. |
| 6,636,887 B1 | 10/2003 | Augeri |
| 6,658,661 B1 | 12/2003 | Arsenault et al. |
| 6,678,891 B1 | 1/2004 | Wilcox et al. |
| 6,684,400 B1 | 1/2004 | Goode et al. |
| 6,694,312 B2 | 2/2004 | Kobayashi et al. |
| 6,698,020 B1 | 2/2004 | Zigmond et al. |
| 6,704,359 B1 | 3/2004 | Bayrakeri et al. |
| 6,731,310 B2 | 5/2004 | Craycroft et al. |
| 6,745,367 B1 | 6/2004 | Bates et al. |
| 6,760,043 B2 | 7/2004 | Markel |
| 6,763,522 B1 | 7/2004 | Kondo et al. |
| 6,766,526 B1 | 7/2004 | Ellis |
| 6,806,887 B2 | 10/2004 | Chernock et al. |
| 6,857,128 B1 | 2/2005 | Borden, IV et al. |
| 6,886,029 B1 | 4/2005 | Pecus et al. |
| 6,904,610 B1 | 6/2005 | Bayrakeri et al. |
| 6,910,191 B2 | 6/2005 | Segerberg et al. |
| 6,918,131 B1 | 7/2005 | Rautila et al. |
| 6,963,880 B1 | 11/2005 | Pingte et al. |
| 7,028,327 B1 | 4/2006 | Dougherty et al. |
| 7,065,785 B1 | 6/2006 | Shaffer et al. |
| 7,080,400 B1 | 7/2006 | Navar |
| 7,103,904 B1 | 9/2006 | Blackketter et al. |
| 7,114,170 B2 | 9/2006 | Harris et al. |
| 7,134,072 B1 | 11/2006 | Lovett et al. |
| 7,152,236 B1 | 12/2006 | Wugofski et al. |
| 7,162,694 B2 | 1/2007 | Venolia |
| 7,162,697 B2 | 1/2007 | Markel |
| 7,174,512 B2 | 2/2007 | Martin et al. |
| 7,177,861 B2 | 2/2007 | Tovinkere et al. |
| 7,197,715 B1 | 3/2007 | Valeria |
| 7,207,057 B1 | 4/2007 | Rowe |
| 7,213,005 B2 | 5/2007 | Mourad et al. |
| 7,221,801 B2 | 5/2007 | Jang et al. |
| 7,237,252 B2 | 6/2007 | Billmaier |
| 7,293,275 B1 | 11/2007 | Krieger et al. |
| 7,305,696 B2 | 12/2007 | Thomas et al. |
| 7,313,806 B1 | 12/2007 | Williams et al. |
| 7,337,457 B2 | 2/2008 | Pack et al. |
| 7,360,232 B2 | 4/2008 | Mitchell |
| 7,363,612 B2 | 4/2008 | Satuloori et al. |
| 7,406,705 B2 | 7/2008 | Crinon et al. |
| 7,440,967 B2 | 10/2008 | Chidlovskii |
| 7,464,344 B1 | 12/2008 | Carmichael et al. |
| 7,472,137 B2 | 12/2008 | Edelstein et al. |
| 7,490,092 B2 | 2/2009 | Sibley et al. |
| 7,516,468 B1 | 4/2009 | Deller et al. |
| 7,523,180 B1 | 4/2009 | DeLuca et al. |
| 7,587,415 B2 | 9/2009 | Gaurav et al. |
| 7,624,416 B1 | 11/2009 | Vandermolen et al. |
| 7,640,487 B2 | 12/2009 | Amielh-Caprioglio et al. |
| 7,702,315 B2 | 4/2010 | Engstrom et al. |
| 7,703,116 B1 | 4/2010 | Moreau et al. |
| 7,721,307 B2 | 5/2010 | Hendricks et al. |
| 7,743,330 B1 | 6/2010 | Hendricks et al. |
| 7,752,258 B2 | 7/2010 | Lewin et al. |
| 7,805,746 B2 | 9/2010 | Brandyberry et al. |
| 7,818,667 B2 | 10/2010 | Adams |
| 7,861,259 B2 | 12/2010 | Barone, Jr. |
| 7,913,286 B2 | 3/2011 | Sarachik et al. |
| 7,958,528 B2 | 6/2011 | Moreau et al. |
| 7,975,277 B1 | 7/2011 | Jerding et al. |
| 8,006,262 B2 | 8/2011 | Rodriguez et al. |
| 8,032,914 B2 | 10/2011 | Rodriguez |
| 8,042,132 B2 | 10/2011 | Carney et al. |
| 8,156,533 B2 | 4/2012 | Crichton |
| 8,220,018 B2 | 7/2012 | de Andrade et al. |
| 8,266,652 B2 | 9/2012 | Roberts et al. |

(56) References Cited

U.S. PATENT DOCUMENTS

| | | |
|---|---|---|
| 8,296,805 B2 | 10/2012 | Tabatabai et al. |
| 8,352,983 B1 | 1/2013 | Chane et al. |
| 8,365,230 B2 | 1/2013 | Chane et al. |
| 8,381,259 B1 | 2/2013 | Khosla |
| 8,413,205 B2 | 4/2013 | Carney et al. |
| 8,416,952 B1 | 4/2013 | Moreau et al. |
| 8,434,109 B2 | 4/2013 | Kamimaeda et al. |
| 8,448,208 B2 | 5/2013 | Moreau et al. |
| 8,578,411 B1 | 11/2013 | Carney et al. |
| 8,660,545 B1 | 2/2014 | Redford et al. |
| 8,699,862 B1 | 4/2014 | Sharifi et al. |
| 8,707,354 B1 | 4/2014 | Moreau et al. |
| 8,745,658 B2 | 6/2014 | Carney et al. |
| 8,756,634 B2 | 6/2014 | Chane et al. |
| 8,793,256 B2 | 7/2014 | McIntire et al. |
| 8,819,734 B2 | 8/2014 | Moreau et al. |
| 8,850,480 B2 | 9/2014 | Chane et al. |
| 8,850,495 B2 | 9/2014 | Pan |
| 8,863,196 B2 | 10/2014 | Patil et al. |
| 8,938,675 B2 | 1/2015 | Holladay et al. |
| 8,943,533 B2 | 1/2015 | de Andrade et al. |
| 8,973,063 B2 | 3/2015 | Spilo et al. |
| 9,021,528 B2 | 4/2015 | Moreau et al. |
| 9,197,938 B2 | 11/2015 | Chane et al. |
| 9,363,560 B2 | 6/2016 | Moreau et al. |
| 9,414,022 B2 | 8/2016 | Adams |
| 9,451,196 B2 | 9/2016 | Carney et al. |
| 9,473,548 B1 | 10/2016 | Chakrovorthy et al. |
| 9,516,253 B2 | 12/2016 | De Andrade et al. |
| 9,553,927 B2 | 1/2017 | Sharma et al. |
| 9,729,924 B2 | 8/2017 | Moreau et al. |
| 9,967,611 B2 | 5/2018 | Andrade et al. |
| 9,992,546 B2 | 6/2018 | Moreau et al. |
| 10,110,973 B2 | 10/2018 | Adams |
| 10,149,014 B2 | 12/2018 | Chane et al. |
| 10,171,878 B2 | 1/2019 | Carney et al. |
| 10,237,617 B2 | 3/2019 | Moreau et al. |
| 10,491,942 B2 | 11/2019 | de Andrade et al. |
| 10,575,070 B2 | 2/2020 | Adams |
| 10,587,930 B2 | 3/2020 | Chane et al. |
| 10,602,225 B2 | 3/2020 | Carney et al. |
| 10,616,644 B2 | 4/2020 | Moreau et al. |
| 10,664,138 B2 | 5/2020 | Carney et al. |
| 10,687,114 B2 | 6/2020 | Carney et al. |
| 10,848,830 B2 | 11/2020 | Moreau et al. |
| 10,880,609 B2 | 12/2020 | Chipman et al. |
| 11,070,890 B2 | 7/2021 | Carney et al. |
| 11,089,364 B2 | 8/2021 | Moreau et al. |
| 11,115,722 B2 | 9/2021 | Johnson |
| 2001/0014206 A1 | 8/2001 | Artigalas et al. |
| 2001/0027563 A1 | 10/2001 | White et al. |
| 2001/0049823 A1 | 12/2001 | Matey |
| 2001/0056573 A1 | 12/2001 | Kovac et al. |
| 2001/0056577 A1 | 12/2001 | Gordon et al. |
| 2002/0010928 A1 | 1/2002 | Sahota |
| 2002/0016969 A1 | 2/2002 | Kimble |
| 2002/0023270 A1 | 2/2002 | Thomas et al. |
| 2002/0026642 A1 | 2/2002 | Augenbraun et al. |
| 2002/0032905 A1 | 3/2002 | Sherr et al. |
| 2002/0035573 A1 | 3/2002 | Black et al. |
| 2002/0041104 A1 | 4/2002 | Graf et al. |
| 2002/0042915 A1 | 4/2002 | Kubischta et al. |
| 2002/0042920 A1 | 4/2002 | Thomas et al. |
| 2002/0046099 A1 | 4/2002 | Frengut et al. |
| 2002/0059094 A1 | 5/2002 | Hosea et al. |
| 2002/0059586 A1 | 5/2002 | Carney et al. |
| 2002/0059629 A1 | 5/2002 | Markel |
| 2002/0067376 A1 | 6/2002 | Martin et al. |
| 2002/0069407 A1 | 6/2002 | Fagnani et al. |
| 2002/0070978 A1 | 6/2002 | Wishoff et al. |
| 2002/0078444 A1 | 6/2002 | Krewin et al. |
| 2002/0078449 A1 | 6/2002 | Gordon et al. |
| 2002/0083450 A1 | 6/2002 | Kamen et al. |
| 2002/0100041 A1 | 7/2002 | Rosenberg et al. |
| 2002/0104083 A1 | 8/2002 | Hendricks et al. |
| 2002/0107973 A1 | 8/2002 | Lennon et al. |
| 2002/0108121 A1 | 8/2002 | Alao et al. |
| 2002/0108122 A1 | 8/2002 | Alao et al. |
| 2002/0120609 A1 | 8/2002 | Lang et al. |
| 2002/0124254 A1 | 9/2002 | Kikinis |
| 2002/0124256 A1 | 9/2002 | Suzuka |
| 2002/0144268 A1 | 10/2002 | Khoo et al. |
| 2002/0144269 A1 | 10/2002 | Connelly |
| 2002/0144273 A1 | 10/2002 | Reto |
| 2002/0147645 A1 | 10/2002 | Alao et al. |
| 2002/0152477 A1 | 10/2002 | Goodman et al. |
| 2002/0156839 A1 | 10/2002 | Peterson et al. |
| 2002/0156890 A1 | 10/2002 | Carlyle et al. |
| 2002/0162120 A1 | 10/2002 | Mitchell |
| 2002/0169885 A1 | 11/2002 | Alao et al. |
| 2002/0170059 A1 | 11/2002 | Hoang |
| 2002/0171691 A1 | 11/2002 | Currans et al. |
| 2002/0171940 A1 | 11/2002 | He et al. |
| 2002/0184629 A1 | 12/2002 | Sie et al. |
| 2002/0188944 A1 | 12/2002 | Noble |
| 2002/0194181 A1 | 12/2002 | Wachtel |
| 2002/0196268 A1 | 12/2002 | Wolff et al. |
| 2002/0199187 A1 | 12/2002 | Gissin et al. |
| 2002/0199190 A1 | 12/2002 | Su |
| 2003/0001880 A1 | 1/2003 | Holtz et al. |
| 2003/0005444 A1 | 1/2003 | Crinon et al. |
| 2003/0005453 A1 | 1/2003 | Rodriguez et al. |
| 2003/0014752 A1 | 1/2003 | Zaslavsky et al. |
| 2003/0014753 A1 | 1/2003 | Beach et al. |
| 2003/0018755 A1 | 1/2003 | Masterson et al. |
| 2003/0023970 A1 | 1/2003 | Panabaker |
| 2003/0023975 A1 | 1/2003 | Schrader et al. |
| 2003/0025832 A1 | 2/2003 | Swart et al. |
| 2003/0028871 A1 | 2/2003 | Wang et al. |
| 2003/0028873 A1 | 2/2003 | Lemmons |
| 2003/0041104 A1 | 2/2003 | Wingard et al. |
| 2003/0051246 A1 | 3/2003 | Wilder et al. |
| 2003/0056216 A1 | 3/2003 | Wugofski et al. |
| 2003/0056218 A1 | 3/2003 | Wingard et al. |
| 2003/0058948 A1 | 3/2003 | Kelly et al. |
| 2003/0061028 A1 | 3/2003 | Dey et al. |
| 2003/0066081 A1 | 4/2003 | Barone et al. |
| 2003/0067554 A1 | 4/2003 | Klarfeld et al. |
| 2003/0068046 A1 | 4/2003 | Lindqvist et al. |
| 2003/0070170 A1 | 4/2003 | Lennon |
| 2003/0079226 A1 | 4/2003 | Barrett |
| 2003/0084443 A1 | 5/2003 | Laughlin et al. |
| 2003/0084444 A1 | 5/2003 | Ullman et al. |
| 2003/0084449 A1 | 5/2003 | Chane et al. |
| 2003/0086694 A1 | 5/2003 | Davidsson |
| 2003/0093760 A1 | 5/2003 | Suzuki et al. |
| 2003/0093790 A1 | 5/2003 | Logan et al. |
| 2003/0093792 A1 | 5/2003 | Labeeb et al. |
| 2003/0097657 A1 | 5/2003 | Zhou et al. |
| 2003/0110500 A1 | 6/2003 | Rodriguez |
| 2003/0110503 A1 | 6/2003 | Perkes |
| 2003/0115219 A1 | 6/2003 | Chadwick |
| 2003/0115612 A1 | 6/2003 | Mao et al. |
| 2003/0126601 A1 | 7/2003 | Roberts et al. |
| 2003/0132971 A1 | 7/2003 | Billmaier et al. |
| 2003/0135464 A1 | 7/2003 | Mourad et al. |
| 2003/0135582 A1 | 7/2003 | Allen et al. |
| 2003/0140097 A1 | 7/2003 | Schloer |
| 2003/0151621 A1 | 8/2003 | McEvilly et al. |
| 2003/0158777 A1 | 8/2003 | Schiff et al. |
| 2003/0172370 A1 | 9/2003 | Satuloori et al. |
| 2003/0177501 A1 | 9/2003 | Takahashi et al. |
| 2003/0182663 A1 | 9/2003 | Gudorf et al. |
| 2003/0189668 A1 | 10/2003 | Newnam et al. |
| 2003/0204814 A1 | 10/2003 | Elo et al. |
| 2003/0204846 A1 | 10/2003 | Breen et al. |
| 2003/0204854 A1 | 10/2003 | Blackketter et al. |
| 2003/0207696 A1 | 11/2003 | Willenegger et al. |
| 2003/0226141 A1 | 12/2003 | Krasnow et al. |
| 2003/0229899 A1 | 12/2003 | Thompson et al. |
| 2004/0003402 A1 | 1/2004 | McKenna |
| 2004/0003404 A1 | 1/2004 | Boston et al. |
| 2004/0019900 A1 | 1/2004 | Knightbridge et al. |
| 2004/0019908 A1 | 1/2004 | Williams et al. |

(56) References Cited

U.S. PATENT DOCUMENTS

| | | |
|---|---|---|
| 2004/0022271 A1 | 2/2004 | Fichet et al. |
| 2004/0024753 A1 | 2/2004 | Chane et al. |
| 2004/0025180 A1 | 2/2004 | Begeja et al. |
| 2004/0031015 A1 | 2/2004 | Ben-Romdhane et al. |
| 2004/0031058 A1 | 2/2004 | Reisman |
| 2004/0031062 A1 | 2/2004 | Lemmons |
| 2004/0039754 A1 | 2/2004 | Harple |
| 2004/0073915 A1 | 4/2004 | Dureau |
| 2004/0078814 A1 | 4/2004 | Allen |
| 2004/0107437 A1 | 6/2004 | Reichardt et al. |
| 2004/0107439 A1 | 6/2004 | Hassell et al. |
| 2004/0111465 A1 | 6/2004 | Chuang et al. |
| 2004/0128699 A1 | 7/2004 | Delpuch et al. |
| 2004/0133923 A1 | 7/2004 | Watson et al. |
| 2004/0136698 A1 | 7/2004 | Mock |
| 2004/0168186 A1 | 8/2004 | Rector et al. |
| 2004/0172648 A1 | 9/2004 | Xu et al. |
| 2004/0189658 A1 | 9/2004 | Dowdy |
| 2004/0194136 A1 | 9/2004 | Finseth et al. |
| 2004/0199578 A1 | 10/2004 | Kapczynski et al. |
| 2004/0221306 A1 | 11/2004 | Noh |
| 2004/0224723 A1 | 11/2004 | Farcasiu |
| 2004/0225751 A1 | 11/2004 | Urali |
| 2004/0226051 A1 | 11/2004 | Carney et al. |
| 2005/0005288 A1 | 1/2005 | Novak |
| 2005/0015796 A1 | 1/2005 | Bruckner et al. |
| 2005/0015804 A1 | 1/2005 | LaJoie et al. |
| 2005/0028208 A1 | 2/2005 | Ellis et al. |
| 2005/0086172 A1 | 4/2005 | Stefik |
| 2005/0125835 A1 | 6/2005 | Wei |
| 2005/0149972 A1 | 7/2005 | Knudson |
| 2005/0155063 A1 | 7/2005 | Bayrakeri et al. |
| 2005/0160458 A1 | 7/2005 | Baumgartner |
| 2005/0166230 A1 | 7/2005 | Gaydou et al. |
| 2005/0204385 A1 | 9/2005 | Sull et al. |
| 2005/0259147 A1 | 11/2005 | Nam et al. |
| 2005/0262542 A1 | 11/2005 | DeWeese et al. |
| 2005/0283800 A1 | 12/2005 | Ellis et al. |
| 2005/0287948 A1 | 12/2005 | Hellwagner et al. |
| 2006/0004743 A1 | 1/2006 | Murao et al. |
| 2006/0059525 A1 | 3/2006 | Jerding et al. |
| 2006/0068818 A1 | 3/2006 | Leitersdorf et al. |
| 2006/0080707 A1 | 4/2006 | Laksono |
| 2006/0080716 A1 | 4/2006 | Nishikawa et al. |
| 2006/0104511 A1 | 5/2006 | Guo et al. |
| 2006/0105793 A1 | 5/2006 | Gutowski et al. |
| 2006/0125962 A1 | 6/2006 | Shelton et al. |
| 2006/0143191 A1 | 6/2006 | Cho et al. |
| 2006/0156336 A1 | 7/2006 | Knudson et al. |
| 2006/0195865 A1 | 8/2006 | Fablet |
| 2006/0200842 A1 | 9/2006 | Chapman et al. |
| 2006/0206470 A1 | 9/2006 | McIntyre |
| 2006/0206912 A1 | 9/2006 | Klarfeld et al. |
| 2006/0233514 A1 | 10/2006 | Weng et al. |
| 2006/0248572 A1 | 11/2006 | Kitsukama et al. |
| 2007/0019001 A1 | 1/2007 | Ha |
| 2007/0050343 A1 | 3/2007 | Siddaramappa et al. |
| 2007/0064715 A1 | 3/2007 | Lloyd et al. |
| 2007/0083538 A1 | 4/2007 | Roy et al. |
| 2007/0112761 A1 | 5/2007 | Xu et al. |
| 2007/0157247 A1 | 7/2007 | Cordray et al. |
| 2007/0211762 A1 | 9/2007 | Song et al. |
| 2007/0214123 A1 | 9/2007 | Messer et al. |
| 2007/0214488 A1 | 9/2007 | Nguyen et al. |
| 2007/0220016 A1 | 9/2007 | Estrada et al. |
| 2007/0239707 A1 | 10/2007 | Collins et al. |
| 2007/0250901 A1 | 10/2007 | McIntire et al. |
| 2007/0260700 A1 | 11/2007 | Messer |
| 2007/0261072 A1 | 11/2007 | Boulet et al. |
| 2007/0271587 A1 | 11/2007 | Rowe |
| 2008/0037722 A1 | 2/2008 | Klassen |
| 2008/0060011 A1 | 3/2008 | Kelts |
| 2008/0071770 A1 | 3/2008 | Schloter et al. |
| 2008/0092201 A1 | 4/2008 | Agarwal et al. |
| 2008/0113504 A1 | 5/2008 | Lee et al. |
| 2008/0126109 A1 | 5/2008 | Cragun et al. |
| 2008/0133504 A1 | 6/2008 | Messer et al. |
| 2008/0148317 A1 | 6/2008 | Opaluch |
| 2008/0163304 A1 | 7/2008 | Ellis |
| 2008/0183681 A1 | 7/2008 | Messer et al. |
| 2008/0183698 A1 | 7/2008 | Messer et al. |
| 2008/0189740 A1 | 8/2008 | Carpenter et al. |
| 2008/0196070 A1 | 8/2008 | White et al. |
| 2008/0204595 A1 | 8/2008 | Rathod et al. |
| 2008/0208796 A1 | 8/2008 | Messer et al. |
| 2008/0208839 A1 | 8/2008 | Sheshagiri et al. |
| 2008/0221989 A1 | 9/2008 | Messer et al. |
| 2008/0235209 A1 | 9/2008 | Rathod et al. |
| 2008/0235393 A1 | 9/2008 | Kunjithapatham et al. |
| 2008/0235725 A1 | 9/2008 | Hendricks |
| 2008/0250010 A1 | 10/2008 | Rathod et al. |
| 2008/0256097 A1 | 10/2008 | Messer et al. |
| 2008/0266449 A1 | 10/2008 | Rathod et al. |
| 2008/0276278 A1 | 11/2008 | Krieger et al. |
| 2008/0282294 A1 | 11/2008 | Carpenter et al. |
| 2008/0288641 A1 | 11/2008 | Messer et al. |
| 2008/0288644 A1 | 11/2008 | Gilfix et al. |
| 2008/0301320 A1 | 12/2008 | Morris |
| 2008/0301732 A1 | 12/2008 | Archer et al. |
| 2008/0317233 A1 | 12/2008 | Rey et al. |
| 2009/0006315 A1 | 1/2009 | Mukherjea et al. |
| 2009/0019485 A1 | 1/2009 | Ellis et al. |
| 2009/0024629 A1 | 1/2009 | Miyauchi |
| 2009/0025054 A1 | 1/2009 | Gibbs et al. |
| 2009/0083257 A1 | 3/2009 | Bargeron et al. |
| 2009/0094113 A1 | 4/2009 | Berry et al. |
| 2009/0094632 A1 | 4/2009 | Newnam et al. |
| 2009/0094651 A1 | 4/2009 | Damm et al. |
| 2009/0123021 A1 | 5/2009 | Jung et al. |
| 2009/0133025 A1 | 5/2009 | Malhotra et al. |
| 2009/0164904 A1 | 6/2009 | Horowitz et al. |
| 2009/0183210 A1 | 7/2009 | Andrade |
| 2009/0222872 A1 | 9/2009 | Schlack |
| 2009/0228441 A1 | 9/2009 | Sandvik |
| 2009/0240650 A1 | 9/2009 | Wang et al. |
| 2009/0249427 A1 | 10/2009 | Dunnigan et al. |
| 2009/0271829 A1 | 10/2009 | Larsson et al. |
| 2009/0288132 A1 | 11/2009 | Hegde |
| 2009/0292548 A1 | 11/2009 | Van Court |
| 2010/0023966 A1 | 1/2010 | Shahraray et al. |
| 2010/0077057 A1 | 3/2010 | Godin et al. |
| 2010/0079670 A1 | 4/2010 | Frazier et al. |
| 2010/0175084 A1 | 7/2010 | Ellis et al. |
| 2010/0180300 A1 | 7/2010 | Carpenter et al. |
| 2010/0223640 A1 | 9/2010 | Reichardt et al. |
| 2010/0250190 A1 | 9/2010 | Zhang et al. |
| 2010/0251284 A1 | 9/2010 | Ellis et al. |
| 2010/0257548 A1 | 10/2010 | Lee et al. |
| 2011/0055282 A1 | 3/2011 | Hoving |
| 2011/0058101 A1 | 3/2011 | Earley et al. |
| 2011/0087348 A1 | 4/2011 | Wong |
| 2011/0093909 A1 | 4/2011 | Roberts et al. |
| 2011/0131204 A1 | 6/2011 | Bodin et al. |
| 2011/0176787 A1 | 7/2011 | DeCamp |
| 2011/0209180 A1 | 8/2011 | Ellis et al. |
| 2011/0211813 A1 | 9/2011 | Marks |
| 2011/0214143 A1 | 9/2011 | Rits et al. |
| 2011/0219386 A1 | 9/2011 | Hwang et al. |
| 2011/0219419 A1 | 9/2011 | Reisman |
| 2011/0225417 A1 | 9/2011 | Maharajh et al. |
| 2011/0246495 A1 | 10/2011 | Mallinson |
| 2011/0247042 A1 | 10/2011 | Mallinson |
| 2011/0289098 A1* | 11/2011 | Oztaskent ............... G06F 16/43 707/769 |
| 2012/0002111 A1 | 1/2012 | Sandoval et al. |
| 2012/0011550 A1 | 1/2012 | Holland |
| 2012/0054811 A1 | 3/2012 | Spears |
| 2012/0066602 A1 | 3/2012 | Chai et al. |
| 2012/0117151 A1 | 5/2012 | Bill |
| 2012/0185905 A1 | 7/2012 | Kelley |
| 2012/0192226 A1 | 7/2012 | Zimmerman et al. |
| 2012/0227073 A1 | 9/2012 | Hosein et al. |
| 2012/0233646 A1 | 9/2012 | Coniglio et al. |
| 2012/0295686 A1 | 11/2012 | Lockton |

(56) References Cited

U.S. PATENT DOCUMENTS

| | | |
|---|---|---|
| 2012/0324002 A1 | 12/2012 | Chen |
| 2012/0324494 A1 | 12/2012 | Burger et al. |
| 2012/0324495 A1 | 12/2012 | Matthews, III et al. |
| 2012/0324518 A1 | 12/2012 | Thomas et al. |
| 2013/0007043 A1* | 1/2013 | Phillips .................. G06F 16/48 707/769 |
| 2013/0014155 A1 | 1/2013 | Clarke et al. |
| 2013/0040623 A1 | 2/2013 | Chun et al. |
| 2013/0051770 A1 | 2/2013 | Sargent |
| 2013/0103446 A1 | 4/2013 | Bragdon et al. |
| 2013/0110769 A1 | 5/2013 | Ito |
| 2013/0111514 A1 | 5/2013 | Slavin et al. |
| 2013/0170813 A1 | 7/2013 | Woods et al. |
| 2013/0176493 A1 | 7/2013 | Khosla |
| 2013/0198642 A1 | 8/2013 | Carney et al. |
| 2013/0262997 A1 | 10/2013 | Markworth et al. |
| 2013/0298038 A1 | 11/2013 | Spivack et al. |
| 2013/0316716 A1 | 11/2013 | Tapia et al. |
| 2013/0326570 A1 | 12/2013 | Cowper et al. |
| 2013/0332839 A1 | 12/2013 | Frazier et al. |
| 2013/0332852 A1 | 12/2013 | Castanho et al. |
| 2013/0332855 A1 | 12/2013 | Roman et al. |
| 2013/0347018 A1 | 12/2013 | Limp et al. |
| 2013/0347030 A1 | 12/2013 | Oh et al. |
| 2014/0006951 A1 | 1/2014 | Hunter |
| 2014/0009680 A1 | 1/2014 | Moon et al. |
| 2014/0026068 A1 | 1/2014 | Park et al. |
| 2014/0032473 A1 | 1/2014 | Enoki et al. |
| 2014/0053078 A1 | 2/2014 | Kannan |
| 2014/0068648 A1 | 3/2014 | Green et al. |
| 2014/0075465 A1 | 3/2014 | Petrovic et al. |
| 2014/0089423 A1 | 3/2014 | Jackels |
| 2014/0089967 A1 | 3/2014 | Mandalia et al. |
| 2014/0129570 A1 | 5/2014 | Johnson |
| 2014/0149918 A1 | 5/2014 | Asokan et al. |
| 2014/0150022 A1 | 5/2014 | Oh et al. |
| 2014/0237498 A1 | 8/2014 | Ivins |
| 2014/0267931 A1 | 9/2014 | Gilson et al. |
| 2014/0279852 A1 | 9/2014 | Chen |
| 2014/0280695 A1 | 9/2014 | Sharma et al. |
| 2014/0282122 A1 | 9/2014 | Mathur |
| 2014/0325359 A1 | 10/2014 | Vehovsky et al. |
| 2014/0327677 A1 | 11/2014 | Walker |
| 2014/0334381 A1 | 11/2014 | Subramaniam et al. |
| 2014/0359662 A1 | 12/2014 | Packard et al. |
| 2014/0365302 A1 | 12/2014 | Walker |
| 2014/0373032 A1 | 12/2014 | Merry et al. |
| 2015/0020096 A1 | 1/2015 | Walker |
| 2015/0026743 A1 | 1/2015 | Kim et al. |
| 2015/0263923 A1 | 9/2015 | Kruglick |

FOREIGN PATENT DOCUMENTS

| | | |
|---|---|---|
| EP | 1058999 A1 | 12/2000 |
| EP | 1080582 A1 | 3/2001 |
| GB | 2323489 A | 9/1998 |
| GB | 2448874 A | 11/2008 |
| GB | 2448875 A | 11/2008 |
| WO | 9963757 A1 | 12/1999 |
| WO | 2000011869 A1 | 3/2000 |
| WO | 0033576 A1 | 6/2000 |
| WO | 0110115 A1 | 2/2001 |
| WO | 0182613 A1 | 11/2001 |
| WO | 2001084830 A1 | 11/2001 |
| WO | 02063426 A2 | 8/2002 |
| WO | 02063471 A2 | 8/2002 |
| WO | 02063851 A2 | 8/2002 |
| WO | 02063878 A2 | 8/2002 |
| WO | 03009126 A1 | 1/2003 |
| WO | 2003/026275 A2 | 3/2003 |
| WO | 2007115224 A2 | 10/2007 |
| WO | 2008053132 A1 | 5/2008 |
| WO | 2011/053271 A1 | 5/2011 |
| WO | 2012/094105 A1 | 7/2012 |
| WO | 2012/154541 A1 | 11/2012 |

OTHER PUBLICATIONS

U.S. Appl. No. 12/274,452, Method and Apparatus for Delivering Video and Video Related Content as Sub-Asset Level, filed Nov. 20, 2008.

U.S. Appl. No. 14/520,819, Systems and Methods for Curating Content Metadata, filed Oct. 22, 2014.

U.S. Appl. No. 14/842,196, System and Method for Construction, Delivery and Display of iTV Content, filed Sep. 1, 2015.

U.S. Appl. No. 16/740,921, Validation of Content, filed Jan. 13, 2020.

U.S. Appl. No. 16/851,814, Providing Supplemental Content for a Second Screen Experience, filed Apr. 17, 2020.

U.S. Appl. No. 17/076,446, Contextual Navigational Control for Digital Television, filed Oct. 21, 2020.

U.S. Appl. No. 17/100,341, Content Event Messaging, filed Nov. 20, 2020.

U.S. Appl. No. 17/345,381, User Customization of User Interfaces for Interactive Television, filed Jun. 11, 2021.

U.S. Appl. No. 17/357,001, Causing Display of User-Selectable Content Types, filed Jun. 24, 2021.

U.S. Appl. No. 17/586,432, Validation of Content, filed Jan. 27, 2022.

Fernando Pereira, "The MPEG-4 Book", Prentice Hall, Jul. 10, 2002.

Michael Adams, "Open Cable Architecture", Cisco Press, Dec. 3, 1999.

Andreas Kraft and Klaus Hofrichter, "An Approach for Script-Based Broadcast Application Production", Springer-Verlag Berlin Heidelberg, pp. 74-82, 1999.

Mark Riehl, "XML and Perl", Sams, Oct. 16, 2002.

MetaTV, Inc., PCT/US02/29917 filed Sep. 19, 2002, International Search Report dated Apr. 14, 2003; ISA/US; 6 pages.

Sylvain Devillers, "Bitstream Syntax Definition Language: an Input to MPEG-21 Content Representation", Mar. 2001, ISO, ISO/IEC JTC1/SC29/WG11 MPEG01/M7053.

Shim, et al., "A SMIL Based Graphical Interface for Interactive TV", Internet Tech. Laboratory Dept. of Comp. Engineering, San Jose State University, pp. 257-266, 2003.

Yoon, et al., "Video Gadget: MPET-7 Based Audio-Visual Content Indexing and Browsing Engine", LG Electronics Institute of Technology, 2001, pp. 59-68.

Watchwith webpage; http://www.watchwith.com/content_owners/watchwith_plalform_components.jsp (last visited Mar. 12, 2013).

Matt Duffy; TVplus App reveals content click-through rates north of 10% across sync enabled programming; http://www.tvplus.com/blog/TVplus-App-reveals-content-click-through-rates-north-of-10-Percent-across-sync-enabled-programming (retrieved from the Wayback Machine on Mar. 12, 2013).

"In Time for Academy Awards Telecast, Companion TV App Umami Debuts First Real-Time Sharing of a TV Program's Images"; Umami News; http:www.umami.tv/2012-02-23.html (retrieved from the Wayback Machine on Mar. 12, 2013).

European Patent Application No. 09175979.5—Office Action dated Dec. 13, 2011.

Canadian Patent Application No. 2,685,833—Office Action dated Jan. 20, 2012.

Li, Y. et al. "Reliable Video Clock Time Recognition", Pattern Recognition, 2006, 1CPR 1006, 18th International Conference on Pattern Recognition, 4 pages.

European Search Report dated Mar. 1, 2010.

Salton et al., Computer Evaluation of Indexing and Text Processing Journal of the Association for Computing Machinery, vol. 15, No. 1, Jan. 1968, pp. 8-36.

Smith, J.R. et al., An Image and Video Search Engine for the World-Wide Web Storage and Retrieval for Image and Video Databases 5, San Jose, Feb. 13-14, 1997, Proceedings of Spie, Bellingham, Spie, US, vol. 3022, Feb. 13, 1997, pp. 84-95.

(56) References Cited

OTHER PUBLICATIONS

Kontothoanassis, Ledonias et al. "Design, Implementation, and Analysis of a Multimedia Indexing and Delivery Server", Technical Report Series, Aug. 1999, Cambridge Research Laboratory.
Messer, Alan et al., "SeeNSearch: A context Directed Search Facilitator for Home Entertainment Devices", Paper, Samsung Information Systems America Inc., San Jose, CA, 2008.
Boulgouris N. V. et al., "Real-Time Compressed-Domain Spatiotemporal Segmentation and Ontologies for Video Indexing and Retrieval", IEEE Transactions on Circuits and Systems for Video Technology, vol. 14, No. 5, pp. 606-621, May 2004.
Changsheng Xu et al., "Using Webcast Text for Semantic Event Detection in Broadcast Sports Video", IEEE Transactions on Multimedia, vol. 10, No. 7, pp. 1342-1355, Nov. 2008.
Liang Bai et al., "Video Semantic Content Analysis based on Ontology", International Machine Vision and Image Processing Conference, pp. 117-124, Sep. 2007.
Koskela M. et al., "Measuring Concept Similarities in Multimedia Ontologies: Analysis and Evaluations", IEEE Transactions on Multimedia, vol. 9, No. 5, pp. 912-922, Aug. 2007.
Steffan Staab et al., "Semantic Multimedia", Reasoning Web; Lecture Notes in Computer Science, pp. 125-170, Sep. 2008.
European Search Report for Application No. 09180776.8, mailed Jun. 7, 2010, 9 pages.
European Search Report, EP 09 18 0762, completion date Mar. 22, 2010.
European Search Report dated Jun. 4, 2010.
EP Application No. 09 179 987.4-1241—Office Action mailed Feb. 15, 2011.
European Application No. 09 175 979.5—Office Action dated Apr. 11, 2011.
Boronat F et al: "Multimedia group and inter-stream synchronization techniques: A comparative study", Information Systems. Pergamon Press. Oxford. GB. vol. 34. No. 1. Mar. 1, 2009 (Mar. 1, 2009). pp. 108-131. XP025644936.
Extended European Search Report—EP14159227.9—Mailing Date: Sep. 3, 2014.
Canadian Office Action—CA 2,685,833—Dated Jan. 22, 2015.
European Extended Search Report—EP 13192112.4—Dated May 11, 2015.
CA Response to Office Action—CA Appl. 2,685,833—Submitted Jul. 17, 2015.
Response to European Office Action—European Appl. 13192112.4—submitted Dec. 9, 2015.
CA Office Action—CA App 2,685,833—Mailed Jan. 27, 2016.
European Office Action—EP App 14159227.9—Dated Jul. 12, 2016.
Agnieszka Zagozdzinnska et al. "TRIDAQ Systems in HEP Experiments at LHC Accelerator" Kwartalnik Elektroniki I Telekomunikacji, vol. 59, No. 4, Oct. 2013.
CA Office Action—CA Application 2685833—Mailed Feb. 8, 2017.
Nov. 29, 2017—Canadian Office Action—CA 2,685,833.
Feb. 19, 2018—European Summons to Oral Proceedings—EP 14159227.9.
Mar. 9, 2018—European Office Action—EP 13192112.4.
Jul. 31, 2018—European Decision to Refuse—14159227.9.
Sep. 5, 2019—Canadian Office Action—CA 2,685,833.
Nov. 6, 2019—Canadian Office Action—CA 2,832,800.
Apr. 21, 2020—European Summons to Oral Proceedings—EP 09175979.5.
Aug. 24, 2020, Canadian Office Action, CA 2,832,800.
Oct. 31, 2022—CA Office Action—CA App. No. 2,832,800.

* cited by examiner

FIG. 4A

```
Metadata Tag Creator/Viewer Application          - | □ | X
File  Edit  View  Favorites  Tools  Help Welcome!        Home | My Account | Services | News | Contact Us Home            ☐  Log-in below:
My Account          Or click here to set up a user account
-- Edit Profile
-- Edit Filters     Username: [          ]
Services
News                Password: [          ]
Contact Us
                         ( Submit )
```

FIG. 4B

```
Metadata Tag Creator/Viewer Application          - | □ | X
File  Edit  View  Favorites  Tools  Help Hi John Doe!    Edit your profile:

Home            • Residence: Philadelphia, PA
My Account      • Age: 25
-- Edit Profile • Interests: sports, guitar, hiking, cars
-- Edit Filters • Food: Italian
Services        • Music: Classic Rock
News            • Content Genre: comedy
Contact Us
```

FIG. 4C

```
Metadata Tag Creator/Viewer Application          - | □ | X
File  Edit  View  Favorites  Tools  Help Hi John Doe!    Edit your filters:

Home            ☑ View Metadata from Friends Only
My Account         Choose friends
-- Edit Profile ☑ Type of Metadata
-- Edit Filters       ○ all (default)
Services              ○ advertisements
News                  ● web links
Contact Us            ● video
                      ● audio
                ☐ Genre of Metadata
                      ○ educational
                      ○ comedy
                      ○ trivia
```

CROWDSOURCING SUPPLEMENTAL CONTENT

CROSS-REFERENCE TO RELATED APPLICATIONS

This application is a continuation of U.S. application Ser. No. 13/671,626, filed Nov. 8, 2012, the disclosure of which is hereby incorporated by reference in its entirety.

BACKGROUND

Television viewing is no longer the static, isolated, passive pastime that it used to be. Today, viewers have the option of using a computing device, such as a tablet computer, to view a webpage related to a show they are watching, thereby keeping the viewers engaged in a particular program. The related content, however, requires significant amounts of data related to the show to keep the viewers interested. There remains a need to efficiently gather and provide related information of interest.

SUMMARY

Some of the various features described herein may facilitate acquiring data, such as metadata, and associating the metadata with content. In particular, some of the systems described below allow users to supply metadata related to the content they are consuming using their own user devices.

In accordance with aspects of the disclosure, users, such as subscribers or ordinary consumers (e.g., the "crowd"), may be leveraged to generate and organize metadata content for enhancing consumption of primary content. In an illustrative embodiment, the disclosure teaches a method comprising streaming content to one or more users. While the content is delivered to a first screen device (e.g., a television, computer monitor, mobile device, etc.), users may generate submissions using second screen devices (e.g., smartphones, laptops, tablets, etc.). The submissions, e.g., tag submissions, may include data (which may be made into metadata) relevant to the content. The data may also include information identifying a time point in the content to which the data applies. The tag submissions may be transmitted to another device, which may generate metadata tags using the received tag submissions. Subsequently, the metadata tags may be supplied to second screen devices. Additionally, some aspects of the disclosure relate to computing devices, having a processor and memory storing computer-executable instructions, and other apparatuses to perform the above steps and other steps for improving a second screen experience.

Other details and features will also be described in the sections that follow. This summary is not intended to identify critical or essential features of the inventions claimed herein, but instead merely summarizes certain features and variations thereof.

BRIEF DESCRIPTION OF THE DRAWINGS

Some features herein are illustrated by way of example, and not by way of limitation, in the figures of the accompanying drawings and in which like reference numerals refer to similar elements.

FIGS. 4A-4H are diagrams illustrating an example embodiment of aspects of the present disclosure.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

By way of introduction, some features described herein may allow a user to consume content (e.g., audio visual content such as a television program) on one device (e.g., a television, smartphone, tablet, laptop, etc.) and generate metadata associated with the content using a second device (e.g., a television, smartphone, tablet, laptop, etc.). In one example, a smartphone may be adapted to automatically detect/identify the content that a user is consuming from the audio associated with that content, and may allow a user to submit data to be associated with the content. Further, there may be a system that allows many users to contribute various types of data for the same content. Thus, when other users subsequently consume the content (e.g., television programs, music videos, live events, home videos, etc.), the other users may access the data, including any associated information such as webpages, using their smartphones or other devices. Accordingly, an aspect of the present disclosure is to crowdsource the creation of metadata.

Figure 1:
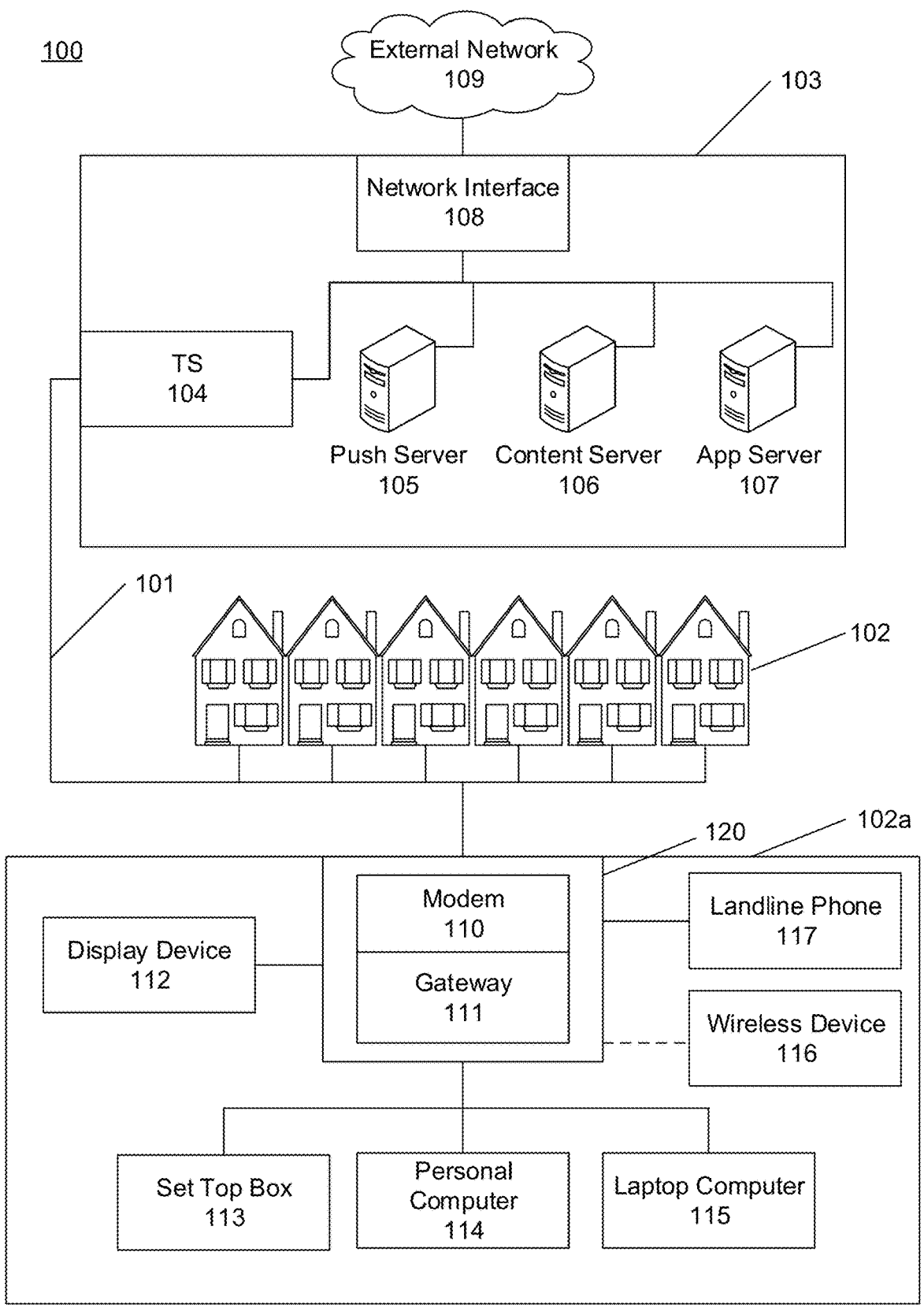
FIG. 1 illustrates an example communication network on which various features described herein may be used.

FIG. 1 illustrates an example communication network 100 on which many of the various features described herein, such as the requesting and retrieval of content and metadata and/or the delivery of metadata to a central database, may be implemented. Network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office or headend 103. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths. By running fiber optic cable along some portions, for example, signal degradation may be significantly minimized, allowing a single local office 103 to reach even farther with its network of links 101 than before.

The local office 103 may include an interface, such as a termination system (TS) 104. More specifically, the interface 104 may be a cable modem termination system (CMTS), which may be a computing device configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content, to encrypt the content, and to initiate delivery (e.g., streaming) of the content to the requesting user(s) and/or device(s).

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. Although shown separately, one of ordinary skill in the art will appreciate that the push server 105, content server 106, and application server 107 may be combined. Further, here the push server 105, content server 106, and application server 107 are shown generally, and it will be understood that they may each contain memory storing computer executable instructions to cause a processor to perform steps described herein and/or memory for storing data, such as information for identifying a user, content audio files for identifying content from an audio profile or audio clip, and metadata for viewing on second screen devices.

An example premises 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local wi-fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102a, to communicate with the local office 103 and other devices beyond the local office 103. The gateway 111 may be a set-top box (STB), digital video recorder (DVR), computer server, or any other desired computing device. The gateway 111 may also include (not shown) local network interfaces to provide communication signals to requesting entities/devices in the premises 102a, such as display devices 112 (e.g., televisions), additional STBs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.16), analog twisted pair interfaces, Bluetooth interfaces, and others.

Figure 2:
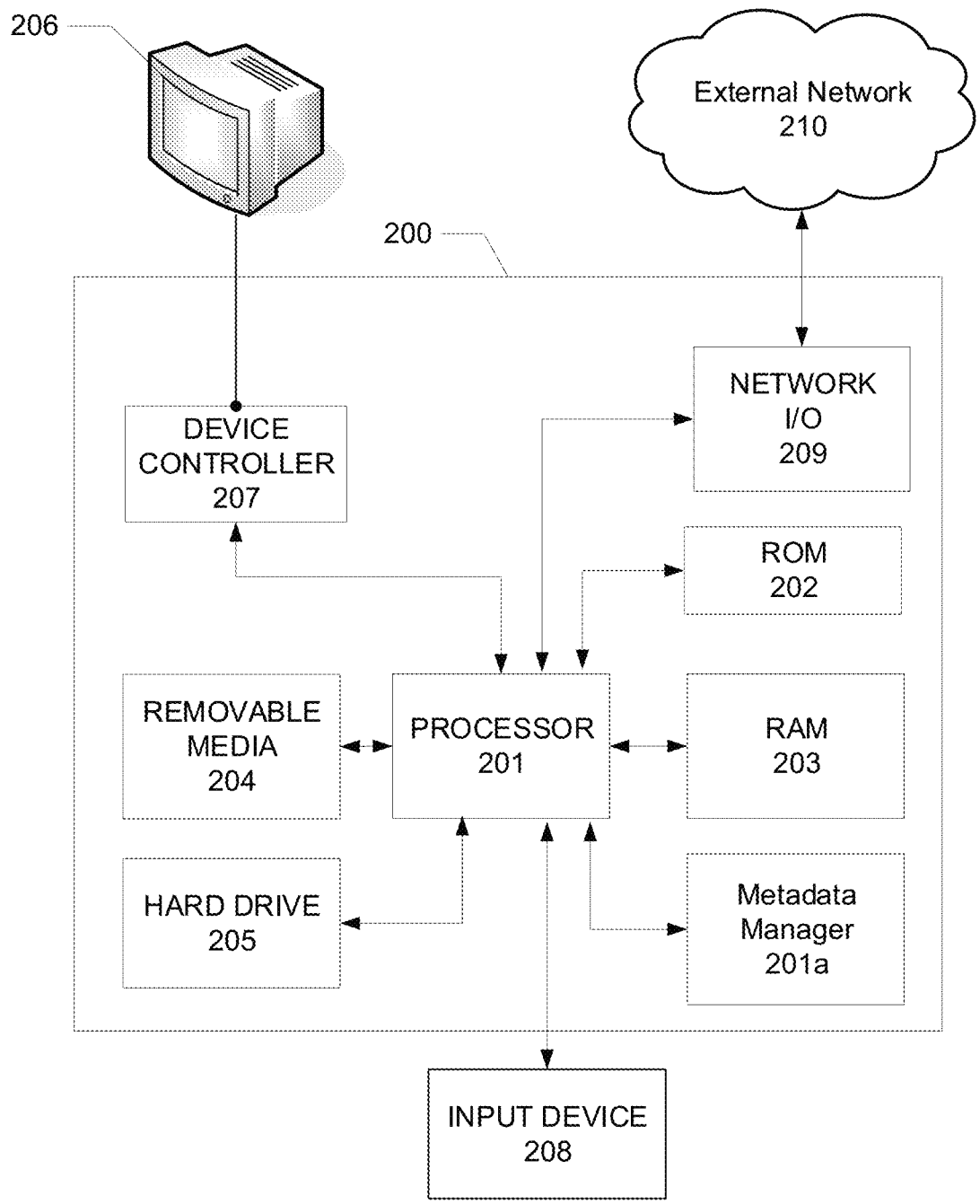
FIG. 2 illustrates an example computing device and software configuration that can be used to implement any of the methods, servers, entities, and computing devices described herein.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network.

The FIG. 2 example is a hardware configuration. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device). Additionally, the computing device 200 may include a metadata manager 201a, which can perform the various metadata collection and generation processes described herein as a replacement for, or augment to, any other processor 201 that the computing device 200 may include. That is, the metadata manager 201a may include a separate processor and/or set of computer-executable instructions stored on a computer-readable medium that, when executed by a processor, cause the processor (or the computing device 200 as a whole) to perform the various metadata collection and generation processes described herein. The metadata manager 201a may also include secure memory (not shown), which can store the various criteria for collecting and generating metadata described herein. The secure memory can be any desired type of memory, and can have enhanced security features to help restrict access (e.g., can only be accessed by the metadata manager 201a, can be internal to the metadata manager 201a, etc.). Where the metadata manager 201a includes a separate set of computer-executable instructions, these instructions may be secured such that only authorized users may be allowed to modify, augment, or delete them.

In some embodiments, the metadata manager 201a may be implemented as an application specific integrated circuit (ASIC). That is, the metadata manager 201a may be a chip designed specifically for performing the various metadata collection and generation processes described herein. Further, the ASIC may be implemented within or in communication with various computing devices provided herein.

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Figure 3:
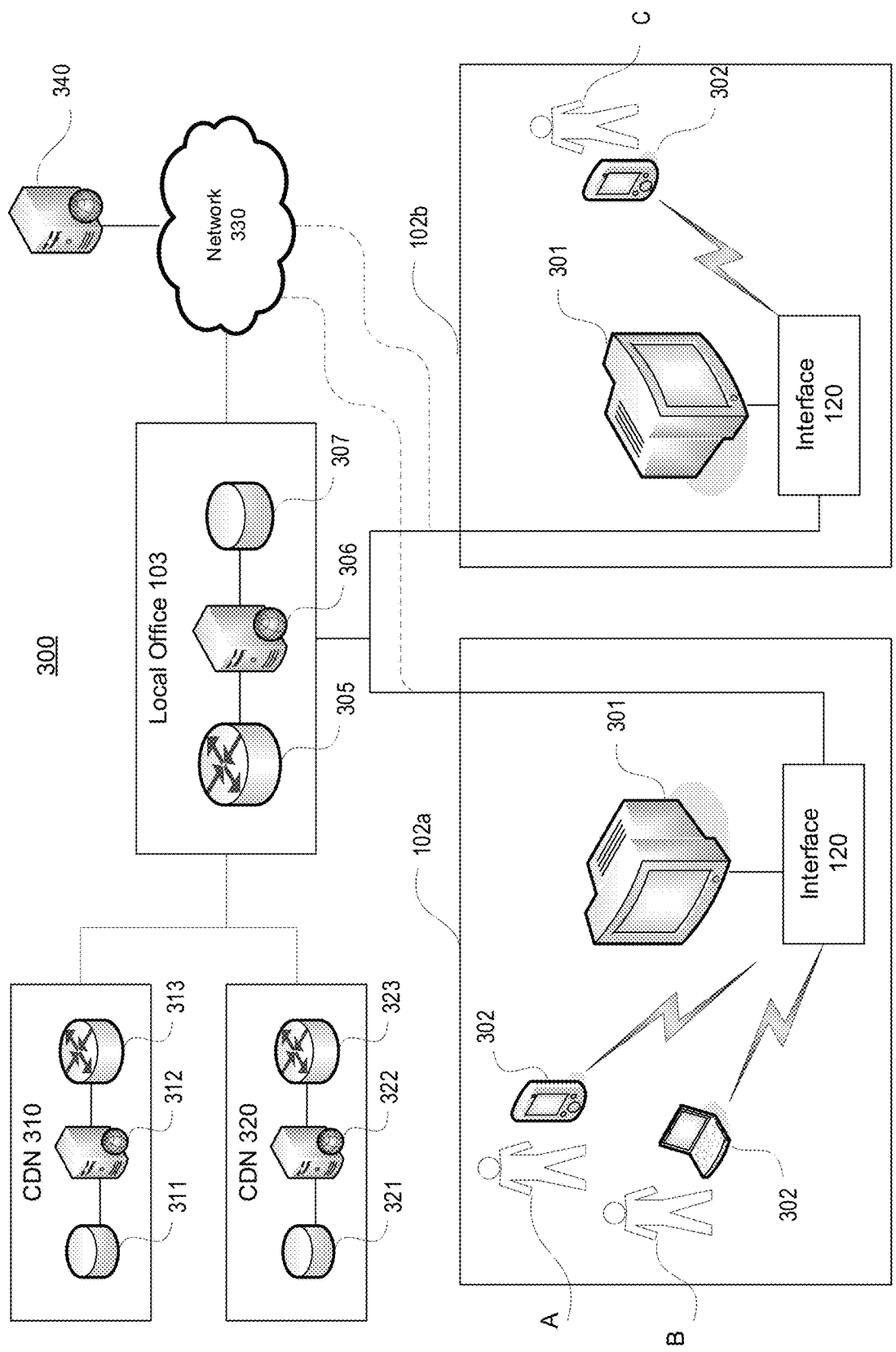
FIG. 3 illustrates a system architecture according to one or more illustrative aspects described herein.

FIG. 3 is a diagram showing an example system architecture 300 on which various features described herein may be performed. The system 300 of FIG. 3 depicts a local office 103, a first premises 102a, a second premises 102b, one or more content databases, such as content distribution networks (CDN) 310 and 320, a network 330, and a second screen experience computing device (e.g., server) 340. As shown in FIG. 1, the local office 103 may connect to the first premises 102a and second premises 102b via links 101. The first premises 102a may include an interface 120 (e.g., a gateway), a first screen device 301 (e.g., a television, a monitor, a projector, a smartphone, etc.), and one or more second screen devices 302 (e.g., a smartphone, tablet, laptop, etc.). As shown, in FIG. 3, multiple users A and B may be located at the first premises 102a and each user may operate a second screen device 302 while consuming content via the first screen device 301. Meanwhile, the second premises 102b may include an interface 120, a first screen device 301, and a second screen device 302 used by a user C. Content, such as video content, may be transmitted (e.g., streamed) from the local office 103 to the interfaces 120 of the first and second premises 102a-b, and to the first screen devices 301. Thus, users A and B may consume content (e.g., view the content) at the premises 102a and user C may consume content at the premises 102b. Notably, while consuming content, each user may operate a respective second screen device 302 to access data related to the content consumed on the first device 301 at their premises 102. For example, user A may operate a second screen device 302, such as a smartphone, to access data, such as the name of an article of clothing worn by an actor shown in the content streamed through the first screen device 301. The data may be any data, such as metadata, that provides information or additional content to supplement the primary content (e.g., linear television program, Internet or other network-stored content, on-demand movies, etc.) consumed on the first screen device 301. For example, data may include a link to an information source, such as a webpage, indicating where an article shown in the primary content can be purchased and how much it can be purchased for, a video clip with bonus features, text and/or images with information about the content itself or about individuals or items shown in the primary content, advertisements, coupons, questions pertaining to the primary content, etc. This data may be generated by viewers, and may grow over time as more users view the content. For example, data may include user commentary about scenes or events in the content. Also, for example, the data may include commentary from a user's friend(s) regarding different scenes in a movie, and the commentary may be tagged to points in time in the movie, so that they may be displayed at the appropriate time. Fans may annotate a particular scene with a link to a webpage where an item in the scene may be purchased. The various data may be collected from ordinary everyday consumers of the content, as well as from formal content sources. The collection and use of this data to generate metadata will be described further below.

Referring to FIG. 3, users may consume content at a premises 102a (e.g., a home, business, etc.). Consuming content may include, for example, watching and/or listening to a television program or an Internet (or another local or global network) video on a first screen device 301. The first screen device 301 may receive the content from the interface 120, which is connected to the local office 103 and configured to retrieve the content. FIG. 3 also illustrates some examples of second screen devices 302, namely a smartphone and a laptop computer. Each (or some) second screen device 302 may be configured to capture audio in connection with the content on the first screen device and to collect, display, and communicate data in response to user inputs. The audio may be the audio associated with the content, e.g., the soundtrack, actors' voices, or other audio signals (e.g., tones) inserted into or carried by the primary content for purposes of audio identification. In cases where other audio signals, such as tones or beeps, are embedded into the primary content, those audio signals may or may not be discernible by a user, but may be detected by a second screen device 302. Further, for example, the second screen device 302 may be a smartphone having an application that allows the smartphone to capture audio through the microphone of the smartphone and respond to user inputs through a keypad or touchscreen of the smartphone to obtain data related to content consumed on a first screen device 301. Although FIG. 3 shows some example second screen devices 302, many other devices may be used as second screen devices 302. Indeed, another television, similar in configuration to a first screen device 301, may be used as the second screen device 302. Moreover, it should be understood that the second screen device 302 might not have a screen, and could be any device, such as a television remote controller, that has input functionality.

Further, each of the second screen devices 302 may be configured to bi-directionally communicate via a wired and/or wireless connection with the second screen experience computing device 340 via the network 330. Specifically, the second screen devices 302 may be configured to access the network 330 (e.g., the Internet or any other local or wide area network, either public or private) to obtain data and to transmit/receive the data via the network 330 to/from the second screen experience computing device 340. For example, a second screen device 302 may transmit data through a wired connection, including the links 101 through which the content is supplied to a first screen device 301, to the local office 103 which then routes the transmission to the network 330 so that it may eventually reach the second screen experience computing device 340. That is, the second screen device 302 may connect to the interface 120 and communicate with the second screen experience computing device 340 over-the-top of the links 101 used to transmit the content downstream. Alternatively, the second screen devices 302 may connect directly to the network 330 to communicate with the second screen experience computing device 340. For example, a second screen device 302 may wirelessly communicate using, for example, a WiFi connection and/or cellular backhaul, to connect to the network 330 (e.g., the Internet) and ultimately to the second screen experience computing device 340. Accordingly, although not shown, the network 330 may include cell towers and/or wireless routers for communicating with the second screen devices 302.

Although FIG. 3 depicts the second screen experience computing device 340 as being separate from the local office 103, in some embodiments, the second screen experience computing device 340 may be located at the local office 103. In such embodiments, the second screen devices 302 may still access the second screen experience computing device 340 through the network 330. Further, even though the second screen experience computing device 340 is shown as a single element, in some embodiments, it may include a number of computing devices 200.

Still referring to FIG. 3, the local office may include a router 305, a second screen experience management platform 306 for executing any of the steps described herein, and a database 307 for storing user information (e.g., user profiles), audio files, metadata, and/or computer-executable instructions for executing audio recognition processes or any of the steps described herein. The router 305 of the local office 103 may forward requests for content from users and/or user devices (e.g., display device 112) at premises 102 to one or more CDNs 310 and 320 that may supply the requested content. Each of the CDNs 310 and 320 may include one or more routers 311 and 321, whose purpose is to receive requests from users (e.g., via their local offices) and route them to servers within its network that may store the requested content and be able to supply it in response to the request. A CDN 310 for a given piece of content might have a hierarchy of one primary source, and a plurality of lower-level servers that can store (e.g., cache) the content and respond to requests. The lower-level servers that ultimately service the request may be referred to as edge servers, such as one or more edge servers 312 and 322. The various servers may include one or more content databases 313 and 323, which store content that the respective CDN 310 and 320 manages. In some embodiments, the CDNs 310 and 320 may provide the same or similar content. In other embodiments, the content of the CDNs 310 and 320 may offer different content from one another. Also, the CDNs 310 and 320 may be maintained/operated by the same or different content providers. Although only two CDNs 310 and 320 are shown, many CDNs may be included in the system architecture 300 of FIG. 3.

FIGS. 4A-4H are diagrams illustrating example screens of an application (or program) configured to allow users to create and/or view metadata relating to a program or content they are consuming. The screens in FIGS. 4A-4H may be displayed on a second screen device 302. A user may operate his/her second screen device 302 to start an application, which may render one or more of the screens shown in FIGS. 4A-4H.

In some cases, the user may have to log-in to proceed to use one or more of the features of the application. As shown in FIG. 4A, logging-in may require entering a username and/or password. In this manner, the application may identify a user of the second screen device 302 running the application. Once the user is logged-in, actions, such as entering data for tag submissions and/or editing pre-existing metadata tags, may be automatically associated with the user.

FIG. 4B illustrates a screen of the application in which a user may edit his/her profile. The profile may be used to customize filters which may filter metadata displayed to the user. Various items may be set in the user profile, such as the user's age, interests, favorite music, etc. Based on this information supplied by the user, only certain metadata may be shown thereby improving the user's second screen experience without overwhelming the user with an excessive amount of metadata that may exist. For example, if a user likes sports, metadata related to sports may be shown on the user's second screen device 302 while other metadata may be filtered out. By supplying profile information, users may also be able to see metadata from other users with similar interests. For example, a user who indicates that she likes country music may choose to specifically receive metadata created by other users who have indicated in their profile that they like country music.

Further, FIG. 4C illustrates a screen that allows a user to control/customize the filters themselves. As shown, the application may allow a user to filter the metadata received to include only metadata from certain individuals (e.g., friends). For example, a user may be more interested in what metadata their friends have submitted than in the metadata created by others. Therefore, the user may control a filter to specify which people (e.g., friends, family, celebrities, etc.) he/she would like to see metadata from.

Another example filter shown in FIG. 4C may allow a user to specify the types of metadata that he/she will receive. For example, if a user desires only to view metadata that is in the form of a video (e.g., bonus video), the user may specify this in a filter of the application. Yet another filter may allow the user to filter the metadata by its genre. As explained herein, when metadata is entered, a genre may be specified for the metadata. This specified genre may be a basis on which other users filter the metadata they wish to view. An example of a genre of metadata may be "trivia." Specifically, some metadata may be characterized as trivia questions pertaining to aspects of the content associated with the metadata. For example, if an actor enters a scene, metadata of the "trivia" genre may include a question such as "Do you know where the actor is from?" and/or a statement indicating that the actor is from "Barcelona, Spain."

FIGS. 4A-4C show example screens for configuring the application for a specific user. In light of these example screens, it should be understood that various other screens may be used to configure the application. Moreover, users may choose to configure the application at any time and/or in various orders. For example, a user may access a screen like the screen in FIG. 4C to configure a filter before accessing a screen like the screen in FIG. 4B to configure a profile.

Figure 4D:
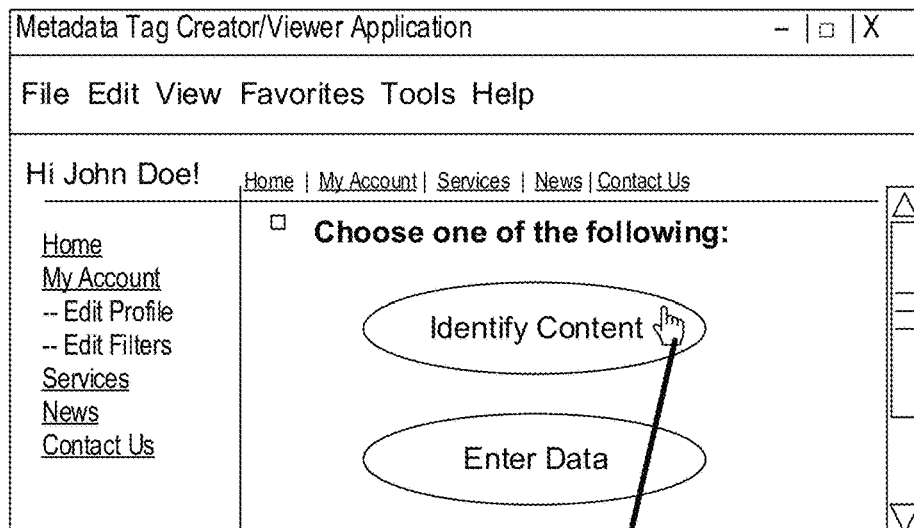
Figure 4E:
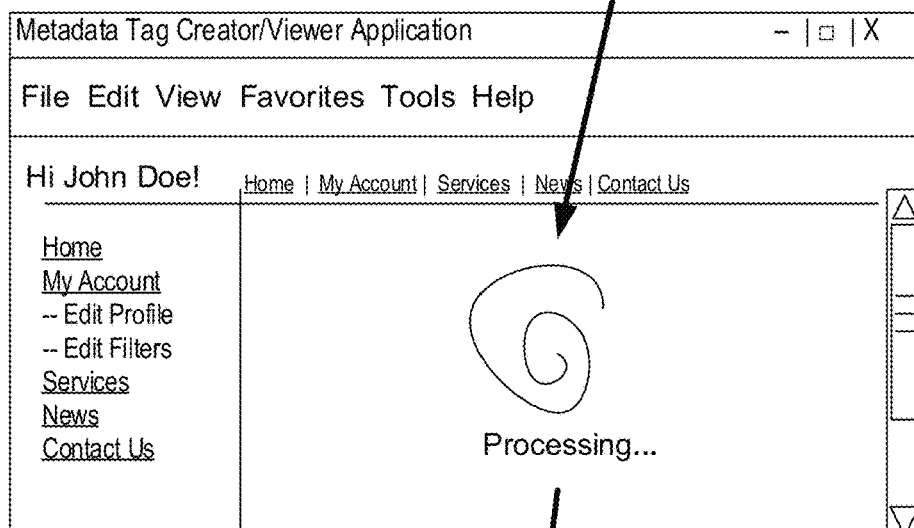

In any event, the user may eventually view a screen like the one shown in FIG. 4D. As shown in the screen of FIG. 4D, a user may choose to select a process for identifying content that the user is currently consuming Identifying the content allows the system to provide the user with the correct stream of metadata, and also helps to match any data uploaded by the user to the correct program and time within the program so that metadata tags may be generated. In some embodiments, the identification can be done with a simple exchange of information between, for example, the second screen device 302 and a primary device, such as a STB or interface 120. For example, the STB may simply report to the device 302 the channel number or service identifier currently being displayed on the main screen 301, and the current playback time. However, in some embodiments, the interface 120 might be a legacy device that lacks the ability to directly communicate with the second screen device 302 in this manner. In such situations, the second screen device 302 may detect an audio profile or capture an audio sample of the content being consumed, and the audio profile or audio sample may be used to identify the content being consumed and the current playback time within the content. For such an embodiment, in response to a selection of the "Identify Content" button in FIG. 4D, a recording screen similar to the screen in FIG. 4E may be displayed on the second screen device 302. Specifically, the screen in FIG. 4E may be displayed while the application detects an audio profile or records an audio clip. When the second screen device 302 is in proximity to a first screen device 301, the detected audio profile may represent the audio associated with the content streaming via the first screen device 301. Once the audio profile is detected, the application may determine the identity of the content streaming on the first screen device 301 based on the audio profile. This determination may include transmitting the audio profile to another device, e.g., the second screen experience computing device 340, and receiving a message indicating the identity of the content. The second screen experience computing device 340 may perform audio recognition techniques to identify the content. Such techniques may include comparing the audio profile with recorded audio samples or other audio profiles from all of the various content offerings made available to the user, to identify an audio match. These recorded audio samples and/or other audio profiles used for the comparison may be stored in databases within the second screen experience computing device 340 or elsewhere (e.g., in the local office 103 or in other computing devices 200 connected to the network 330). In some examples, the search for matching recorded audio samples or other audio profiles may be narrowed with the assistance of electronic program guides. For example, the second screen experience computing device 340 may consult one or more electronic program guides to determine which recorded audio samples or audio profiles to use for the comparison with audio profile received from the second screen device 302.

The identification described above is initiated by the user selecting the "Identify Content" button, but the identification need not require such a user initiation. For example, in some embodiments, the identification process can automatically occur whenever the user launches the metadata application on the second screen device 302, or whenever the user enters data that he/she would like to upload for the content that he/she is currently watching, or when the user wishes to tag a point in a program for which he/she will eventually upload a comment or data (e.g., if the user needs time to collect Internet links for the comment, or to draft the comment, the user can simply tag the point in time and then subsequently draft the data to be associated with the tagged point in time in the content).

Figure 4F:
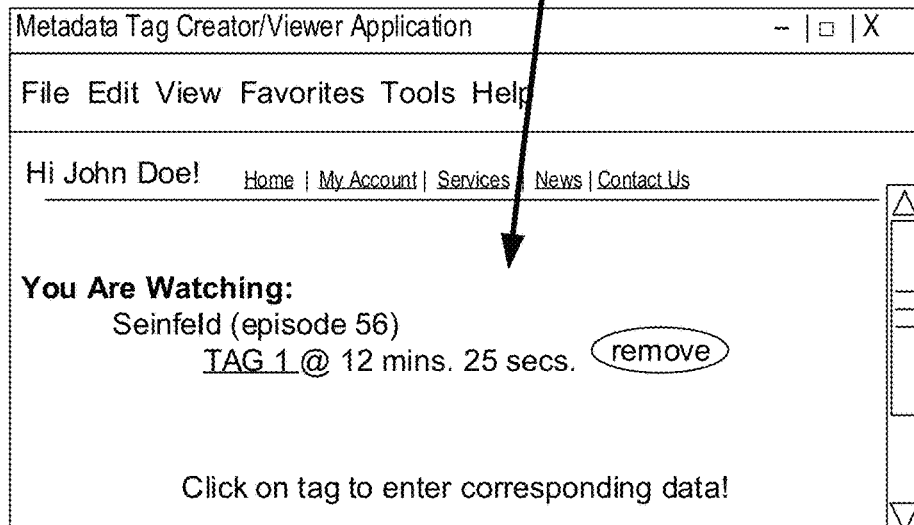

When the application ultimately determines the identity of the content, a screen similar to that shown in FIG. 4F may be displayed so that the identity of the content may be shared with the user of the second screen device 302. Moreover, the screen in FIG. 4F may indicate a data tag identifier (e.g., "Tag 1") and a time stamp (e.g., 12 minutes and 25 seconds) identifying a time within the identified content that corresponds to the audio profile or audio clip. From the screen in FIG. 4F, a user may select to enter data related to the tag. Once the data is entered, a user may submit a metadata tag submission to another device and/or service that is responsible for collecting data from users (e.g., the second screen experience computing device 340 or another computing device including a metadata manager 201a) and generating a metadata tag based on the collected data. Additionally, the screen in FIG. 4F may also allow a user to remove tags if the user later decides not to submit the data.

Figure 4G:
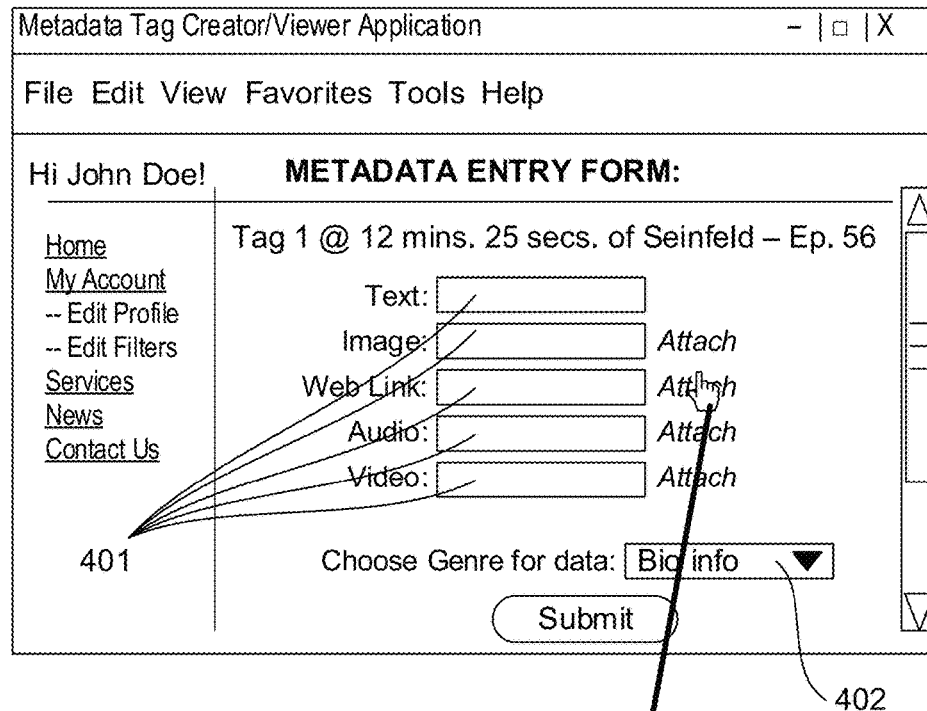

FIG. 4G illustrates a screen that displays a metadata entry form configured to facilitate entry of data to be included in a metadata tag submission. The form may be generated and displayed automatically in response to identifying the content provided on the first screen device 301 from the audio profile or audio clip or in response to a user selection. As shown in FIG. 4G, the form may include a number of fields 401 in which data may be entered. Although FIG. 4G shows that each field may be for a different type of data, in other cases one field may be configured to receive any type of data. In addition to the fields, for entering data, a separate genre field 402 may exist for giving the user the option to classify the data he/she is entering by genre. For example, the user may select from a drop down menu a genre indicating that the data she has or will enter may be classified as biographical information related to the associated content. Also, beside each of the fields 401, the form may include a link for triggering the generation of a dialog box. For example, when a user selects the "Attach" link next to the field for the web link, a dialog box 403 may be displayed.

Figure 4H:
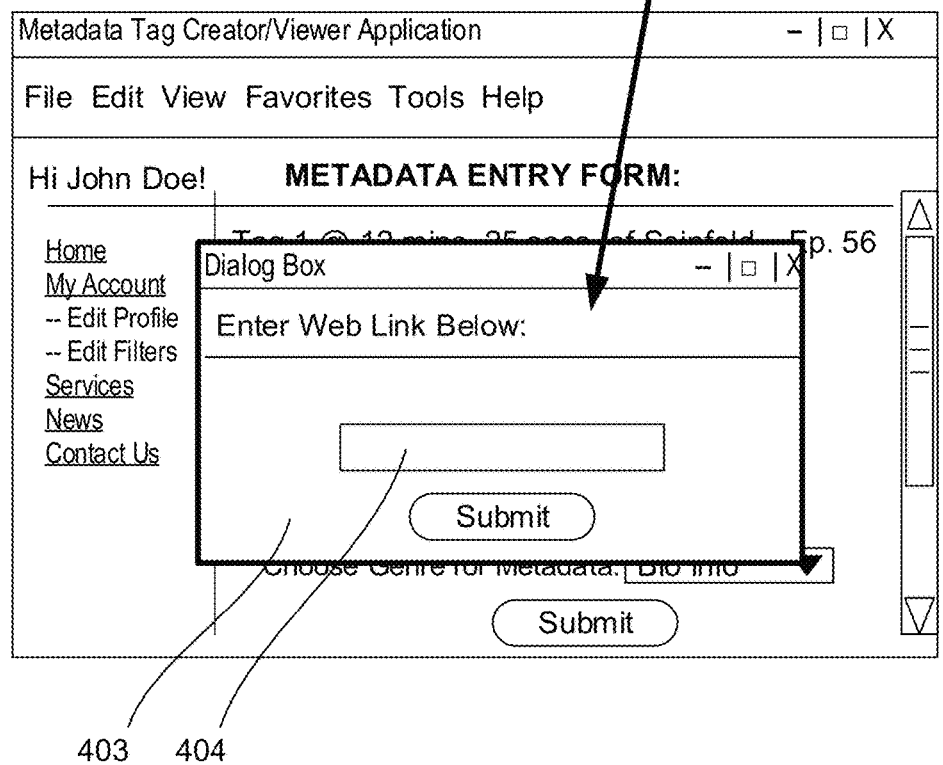

FIG. 4H illustrates an example dialog box 403 that may appear over the metadata entry form. The dialog box 403 may allow a user to browse for the data. For example, the dialog box 403 may allow a user to browse files stored on the hard drive of the second screen device 302 or on a local network (e.g., a local media server). Alternatively, the dialog box 403 may function like a web browser to allow a user to navigate to a website and select a URL of the website, a link within the website, or any other object within the website. The dialog box 403 may allow such a selection to be imported into a field 404 within the dialog box 403. Then, after the user selects "submit" in the dialog box, the data in the field 404 of the dialog box 403 may be imported into the appropriate field 401 of the form. Finally, the data entry may be completed when the user selects "submit" in the metadata entry form. In response to selecting "submit" in the metadata entry form, the application may generate a metadata tag submission described herein. Further, although not depicted in the drawings, after selecting "submit" in the metadata entry form, the application may render a screen showing the submitted data or a screen showing other data submitted for the content provided on the first screen device 301. Additionally, it should be understood that multiple types of data may be entered into the fields 401 when "submit" is selected in the metadata entry form so that multiple types of metadata tags may be generated for a similar time point of the content provided on the first screen device 301. For example, a user may insert text indicating that she bought the same shirt as a particular actress and a web link where it can be purchased.

The metadata entry forms shown in FIGS. 4G and 4H are just examples. In some embodiments, the metadata entry forms may include specific fields that require a user to enter specific information so that each metadata tag created may have a similar format. For example, a user may be required to select a character, an item of clothing, and store from various drop down menus in order to submit a metadata tag submission. While such an embodiment may hinder a user's creativity, the structured metadata tag submission may be beneficial when filtering the metadata.

In addition, the metadata entry form may include a field (not shown) for designating target individuals (e.g., friends, family members, etc.) so that the tag submissions may be available exclusively for the target individuals. For example, a user may select one or more friends that he/she would like to share the metadata with so that when the tag submission is sent, it will only be available to the selected one or more friends. When one or more of the selected friends later views the associated content, he/she can see the metadata in the tag submission that was made available to them. Thus, the metadata entry form may be used to filter metadata submissions on the upstream side as well.

Although the above description explains that the screens in FIGS. 4A-4C may belong to an application, it should be understood that the screens may also be webpages of a website displayed by a web browser. That is, in some embodiments, a user may navigate to a designated website and submit metadata tag submissions through the website.

Figure 5:
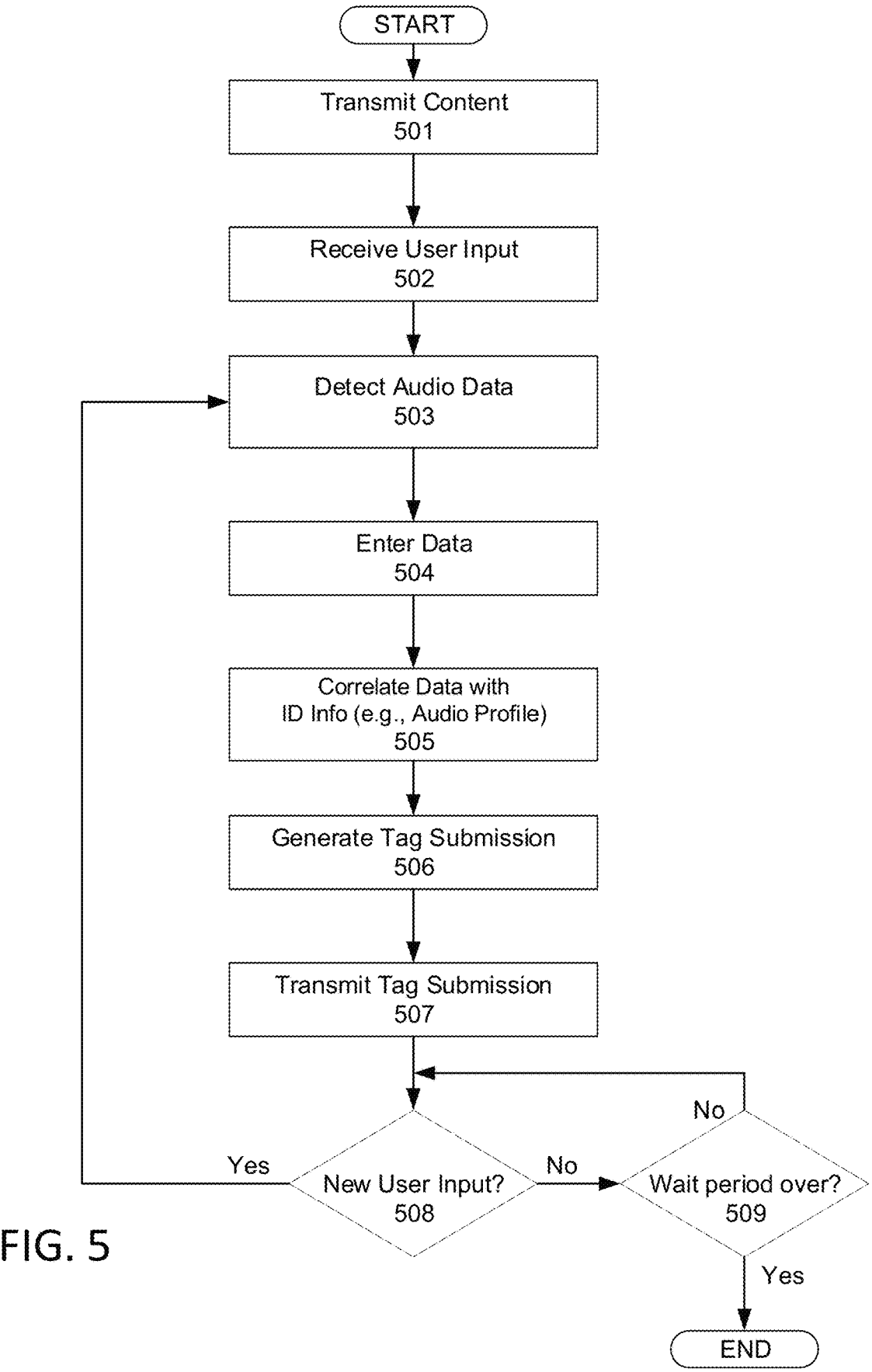
FIG. 5 is a flow diagram illustrating an example method according to one or more aspects of the disclosure.

FIG. 5 is a flow diagram illustrating an example method of the present disclosure in which a user may generate and upload metadata relating to content that he/she is consuming In particular, FIG. 5 describes an example process of acquiring data from a user for uploading to the second screen experience computing device 340. As explained above, an aspect of the present disclosure is to provide a method that allows multiple users (e.g., the "crowd") to assist in generating second screen metadata so that other users viewing video content at a later time may enjoy an enhanced experience by accessing the metadata generated by the crowd. The process in FIG. 5 illustrates how data to be included in a metadata tag submission may be acquired from a single user. It should be understood that many users may perform a similar process as illustrated in FIG. 5 so that a large amount of metadata may be obtained. Also, with regards to the description related to FIG. 5, where the disclosure refers to steps performed by a second screen device 302, it should be understood that these steps may be performed by a computing device processor, such as a processor in second screen device 302, executing computer-executable instructions stored on the second screen device 302. Alternatively, the steps may be performed by any other device that the user may use to generate and/or view metadata for a piece of content.

As shown in FIG. 5, the process may begin with step 501 in which content is provided to the user for consumption, such as via file-based transfer, unicast and/or multicast streaming, analog or digital broadcasting, playback of previously-stored content (e.g., content recorded by a DVR or downloaded at an earlier time), etc. Referring to FIG. 3, step 501 may entail video content being supplied from one or more of the CDNs 310 or 320 to the local office and downstream to one or more of the premises 102. At the premises 102, the video content may be received through the interface 120 and streamed through the first screen device 301. In short, step 501 may include, for example, the known steps for delivering for consumption an item of content to a display device. Additionally, delivering content in step 501 may include delivering audio associated with the video content and/or audible features designed to identify timing within the content. The audio content may be outputted via the first screen device 301 itself or another device connected to the first screen device (e.g., a speaker system).

In step 502, a user may decide that he/she would like to create some supplemental information or content for a particular scene or point in the content. For example, the user may wish to alert others that a particular piece of art in the background was created by a friend. To initiate the supplemental content generation, the user may first enter an input to tag the point in time in the primary content. This may be done, for example, by pressing the "Identify Content" button discussed above. The input may be received via a second screen device 302. Specifically, the user input received at step 502 may be an instruction to generate a tag to identify a point in the content (e.g., a point in a television program) with which the user wishes to associate information. Inputs may be made by users in various ways, such as pressing a button on a keypad of the second screen device 302, pressing a virtual button on a touch-screen of the second screen device 302, submitting a voice command to the second screen device 302, making a predetermined gesture or body movement detected by a camera, etc.

The time at which a user input is received at step 502 depends on the user. When the user consumes (e.g., views) an event on the first screen device 301 and decides to create metadata related to the event, the user may enter user input. For example, if the user is watching a television show and an actor appears on the first screen device 301 wearing a sweater, the user may decide to create metadata that specifies where the sweater may be purchased, and therefore, may enter user input at step 502 to trigger metadata creation. Herein, an event may refer to any occurrence, such as a playback point in time, a scene, a chapter, a character's appearance, etc., within the content streamed on a first screen device 301. At any given time point there may be multiple events. Further, different users may perceive different events, and thus, different users may choose to create metadata for different events occurring at the same time within the content streaming on the first screen device 301. By allowing users to dictate the time at which they can enter data, a large amount of metadata may be acquired and organized.

In response to the user input at step 502, an audio sampling (or audio clip) may be captured at step 503 to help identify the program and a portion of the program to be associated with the user's data. For example, the second screen device 302 may detect and process a 15-second segment of the audio portion of the content and generate a data profile or fingerprint of the detected audio. Specifically, an application on the second screen device 302 may use one or more audio fingerprinting techniques to generate the data profile or fingerprint. The profile of the audio portion may identify detected characteristics of the sound, such as frequencies sampled, volume level, times at which certain frequencies or volume levels were detected, etc. The purpose of the audio profile is to provide data from which an identity of the content being consumed by the user (e.g., streaming on the first screen device 301), as well as a point in time within the content, may be obtained. Notably, it might not be necessary for the first screen device 301 or the interface 120 to send any information other than the sound to the second screen device 302 in order for the second screen device 302 to identify the content being streamed, thereby allowing operation with legacy devices.

In step 503, the second screen device 302 which receives the user input may detect audio through its microphone in response to detecting the user input. Where the content being consumed or rendered on the first screen device 301 includes audio, this audio may be detected by a second screen device 302 that is in relatively close proximity to the first screen device 301 (e.g., within a range that the audio from the content may be detected). For example, while watching a television program on a first screen device 301, a user may operate a second screen device 302 to detect audio associated with the content displayed on the first screen device 301, such as speech of actors within the television program, background music of the television program, etc. Of course, the second screen device 302 may also detect audio from other sources not playing the audio associated with the content on the first screen device 301, such as other people talking in a nearby room. However, audio not pertaining to the content (e.g., noise) may be filtered out or heuristics may be used to analyze the audio clip so that such undesirable noise may be neglected.

To detect the audio at step 503, the second screen device 302 may detect audio for a predetermined period of time (e.g., for five seconds). That is, once a user input is detected in step 502, the second screen device 302 may activate an audio profiling module or fingerprinting module, which may begin to detect audio and store information identifying the profile of the detected audio for the predetermined time period. The predetermined time period may be different for different types of content and in different embodiments. For example, the predetermined time period may be adjusted if the profile for the audio portion is too short to accurately identify the content streamed on the first screen 301, the device 302 may extend the predetermined time period. Further, in some embodiments, the time period for processing may vary depending on how long it takes the detecting device (e.g., the second screen device 302) to recognize that a significant audio sample has been detected and profiled. For example, in some cases, a second screen device 302 may determine that it should process a ten second audio portion, while in other cases the second screen device 302 may determine that it should process a fifteen second audio portion (e.g., where the first 5 seconds of recording were silent). Still, in some embodiments, the duration of the audio portion may be relatively constant, and if the audio portion is not sufficient to identify the content, processing the audio may be repeated a number of times or until the content is identified. The second screen device 302 may send the audio profile to another device (e.g., the second screen experience computing device 340) to determine if it is sufficient to identify the content. Then, based on a response from the other device, the second screen device 302 may determine whether or not to process another audio portion. If the other device is unable to identify the content or the time point within the content that the audio profile pertains to, the second screen device 302 may send an audio profile identifying characteristics of the audio signals detected immediately after the insufficient audio profile. In this manner, the user may still associate metadata with a desired point in time of the content. To accomplish this, the second screen device 302 may process a number of audio portions or a certain amount of audio signals of the content. In some embodiments, the second screen device 302 may use a buffer to implement a first-in-first-out (FIFO) queue storing actual audio clips or audio signals of the profiled portions, so that audio clips or audio signals are temporarily stored. The audio clips or audio signals may be dumped after a certain period of time or depending on the size of the buffer. This buffering, however, is optional, as the audio profiling or fingerprinting application may simply generate the audio profile data dynamically as audio is detected, without requiring recording the audio.

While FIG. 5 illustrates that the user input at step 502 is performed prior to detecting the audio at step 503, it should be understood that this is an example embodiment. In some embodiments, the audio may be detected prior to receiving a user input. For example, a second screen device 302 may begin processing audio when it is first powered on or when an application on the second screen device 302 is initially executed. Also, the second screen device 302 may intermittently (e.g., periodically) process audio or may continuously process audio as long as it is on or as long as an application on the second screen device is running By intermittently or continuously processing the audio, the application may ensure synchronization of the metadata with the content provided on the first screen device 301. Further, where the audio is detected prior to receiving an input, when the user does make the input, the input may trigger a process of identifying a time point and capturing metadata for that time point. For example, the process may generate an audio profile representing a time point of the content and proceed to step 504.

Furthermore, in some embodiments, where audio of content provided on a first screen device 301 is detected prior to receiving a user input on the second screen device 302, the user input may also trigger the content on the first screen device 301 to pause. For example, the content provided on the first screen device 301 may be video-on-demand content, which may be paused. To allow users to enter metadata without missing the content streaming on the first screen device 301, the application on the second screen device 302 may automatically pause the content in response to receiving a user input to begin entry of user metadata. Specifically, the second screen device 302 may pause the content provided on the first screen device 301 by transmitting a signal (e.g., direct infrared signal to a set-top box, or indirect signal by sending a packet to an Internet site that, in turn, transmits a pause command to a digital video recorder or set-top box using EBIF—Enhanced TV Binary Interchange Format—messaging) to the first screen device 301 or another device (e.g., a set top box) associated with the first screen device 301.

In step 504, a user may operate the second screen device 302 to enter the data or information that the user wishes to upload. Entering data may include various processes. For example, it may include typing information, such as the user's commentary, or the name of a store which sells a particular product displayed on the first screen device 301 or the webpage of said store. Further, multiple types of data may be obtained at step 504. For example, a user may acquire both a link for a webpage and text in one implementation of step 504.

In some embodiments, entering data may include navigating to a webpage and copying a link for the webpage and then pasting the link into a data entry area on the device 302. A user may be able to navigate to the webpage from within the same application that is used to record the audio file and acquire the data so that the user can simply select a button to import the universal resource locator (URL) of the webpage as the data. Alternatively, the application on the second screen device 302 may launch a separate application, such as a web browser, to navigate a network, such as the Internet, to locate data and then press a button to capture the URL from the web browser. Therefore, instead of having to perform known copy and paste functions to obtain a URL, the application used to acquire data may include a function that captures a URL automatically.

The user may also use his/her second screen device 302 to create data that is entered. For example, the user may use a global position system (GPS) receiver of the second screen device 302 to identify his/her location and submit the location information as data. The location information may indicate where a product in the content may be found or the geographical location of a scene within the content. Similarly, the user may also use a camera or microphone of the second screen device 302 to capture an image or sound bite that may be used as data to be entered and included in the metadata tag submission.

The entered data may be correlated with the audio profile in step 505. This correlation may be performed automatically by the second screen device 302. For example, after the audio profile is generated in step 503, an application on the second screen device 302 may prompt the user to enter the data, and thus, when the user enters the data, the entered data may be automatically correlated with the audio profile most recently generated. In other examples, a user may input data and then choose to correlate the data with an audio profile previously detected. Thus, a user may generate an audio profile while watching a television program and may later enter data and correlate the data with the audio profile after the television program is over or during a commercial break.

The application may alert the user that there are audio profiles for which metadata tag submissions have not been created. For example, the application may highlight a portion of the display of the second screen device 302 to indicate that the user has incomplete metadata tag submissions outstanding. In some cases, the application may even indicate how many incomplete metadata tag submissions the user has pending.

After the data and audio profile are associated with one another, the second screen device 302 may generate, or provide information to another device to generate, a tag submission at step 506. The tag submission may be a packet, such as an Internet Protocol version four (IPv4) or Internet Protocol version six (IPv6) packet. The packet may include a specific header that addresses the packet to a designated server, such as the second screen experience computing device 340. The packet may further include combined data including the audio profile and the data. In some examples, this combined data may be compressed so that the data in the packet does not include all of the data for the audio profile and/or metadata. In particular, where an audio clip rather than an audio profile is to be included in the packet, the audio clip may be compressed to form data that adequately represents the audio clip. Further, the packet may or may not be stored. The packet may be generated without being stored so as to preserve memory on the second screen device 302.

Once the tag submission is generated, the tag submission is transmitted at step 507 to the destination indicated by the header of the tag submission, for example, the second screen experience computing device 340. In some embodiments, the tag submission may be transmitted in the upstream bandwidth on the same links 101 used to receive the content streamed on the first screen device 301. That is, the tag submission may be transmitted via the links 101 through which content is sent downstream from the local office 103 to the premises 102. In this case, the second screen device 302 may first wirelessly transmit the tag submission to the interface 120 which in turn may direct the tag submission upstream. Alternatively, the second screen device 302 may transmit the tag submission over a wireless network, such as a cellular backhaul, or over another wired connection used by the second screen device 302 for connecting to the network 330 (e.g., the Internet or another local or wide area network).

At step 508 the process of FIG. 5 may determine whether another user input to tag the content for metadata upload is received. If another user input is received, the process returns to step 503 to detect another audio profile. Accordingly, steps of FIG. 5 may be repeated to generate multiple tag submissions including data for various segments of content streamed on the first screen device 301. Notably, the content being streamed may change, and thus, the audio profile in a subsequent implementation of step 503 may be for different content than the previous implementation of step 503. Meanwhile, if a new user input is not detected, step 509 may be performed to determine if a wait period has elapsed since the last user input or whether an application for entering the data is still running. If the wait period has elapsed or the application is terminated, the process of FIG. 5 may end. Otherwise, step 508 may be continuously performed until a new user input is detected. In the meantime, other steps may also be performed. For example, the application on the second screen device 302 may change its display from displaying a form for entering data to a screen for viewing metadata created by others.

In some embodiments, the second screen device 302 may identify the content itself based on the audio profile, and may determine a time point for the audio profile. Or the time point may be obtained from the primary device (e.g., STB displaying content on the display 301). In such cases, the tag submission might not include the audio profile (and the device 302 might not bother detecting one), and instead may include identification information identifying the content, the time point of the audio profile, and secondary information (e.g., the data entered by the user). Still, in other embodiments, the second screen device 302 may send the audio profile to a server (e.g., the second screen experience computing device 340), and may receive identification information from the server in response (e.g., information identifying the content and/or information identifying a time point of the audio profile, which the computing device 340 may determine by comparing the audio profile with prerecorded samples or pre-configured profiles of known programs). In these embodiments, the tag submission also might not include the audio profile, and instead may include the received identification information and corresponding secondary information (e.g., data).

Figure 6:
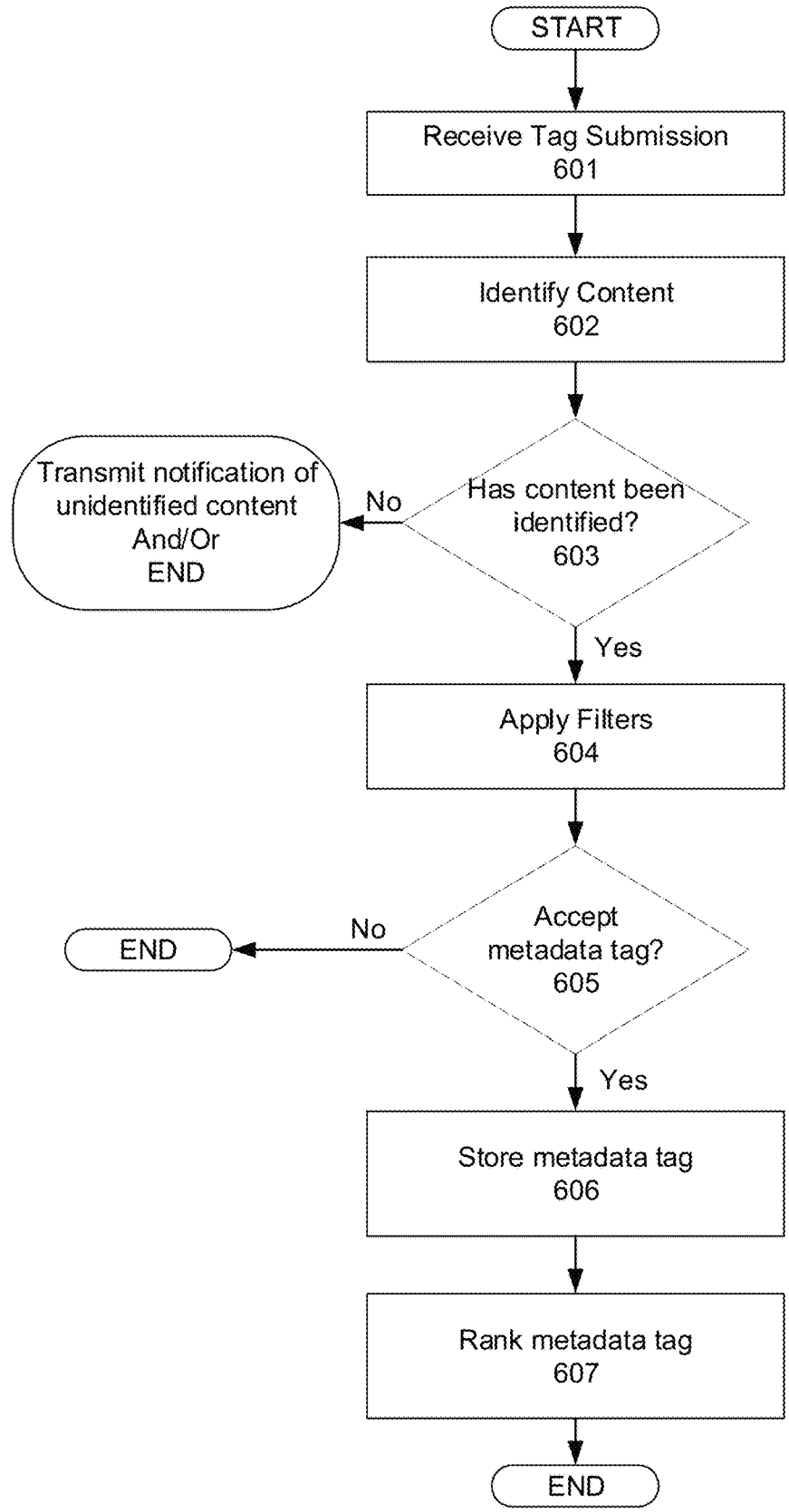
FIG. 6 is a flow diagram illustrating an example method according to one or more aspects of the disclosure.

Next, an example method of processing metadata tag submissions is described with reference to FIG. 6. As explained above, a second screen experience computing device 340 may be configured to store metadata and transfer the metadata to second screen devices 302 so that users may enjoy an enhanced experience. FIG. 6 illustrates how metadata tags may be received by and stored within such a second screen experience computing device 340. FIG. 6 begins with step 601 in which a tag submission is received. The tag submission received in step 601 may correspond to tag submissions transmitted in step 507 of FIG. 5, or may be received or accessed from another source.

In some examples, step 601 may include decoding or parsing the tag submission. As discussed above, the tag submission may include an audio profile and associated data. Thus, when receiving the tag submission, the second screen experience computing device 340 may decode the tag submission (e.g., an IP packet) and separate the data related to the audio profile from the data to be used for the metadata. Similarly, other information included in the tag submission (e.g., an IP packet header) may also be distinguished from the audio profile data and data. In some embodiments, the tag submission may be analyzed to determine whether a time and content identifier is included and/or whether an audio profile is included.

Further, it is contemplated that a computing device, such as the second screen experience computing device 340, may receive multiple tag submissions. In some examples, the second screen experience computing device 340 may be configured to receive more than one tag submission at the same time. To facilitate the potentially large volume of tag submissions that may be received, the second screen experience computing device 340 may include multiple computing devices (e.g., servers).

In step 602, the second screen experience computing device 340 may identify the content associated with the tag submission. Specifically, the audio profile data from the tag submission may be analyzed to identify the content that was consumed through the first screen device 301 by the user who triggered generation of the tag submission. Analyzing the audio profile data may include performing any audio recognition process. To identify the content represented by the audio profile, the second screen experience computing device 340 may include or have access to a database including actual audio files or audio profiles for various content. In some examples, such a database may include audio files and/or audio profiles for all content that may possibly have been consumed by users. In performing an audio recognition process, the second screen experience computing device 340 may access one or more electronic program guides to facilitate (e.g., by narrowing a list of possible audio files based on availability of content) a search for a matching audio file within the database. In some cases, such a database might not include audio files and/or audio profiles for all possible content, and therefore, the content might not be identified. Notably, in some embodiments, audio recognition processes may be performed by the second screen device 302, and thus, the process of step 602 at the second screen experience computing device 302 may be optional.

Step 603 may determine whether the content has been identified in step 602. If the content is identified (Yes at step 603), the method may proceed to step 604. If the content is not identified (No at step 603), a message may be transmitted to the second screen device 302 that sent the tag submission, which included the content that was not identified, notifying the sender that the content could not be identified and the method of FIG. 6 may thereafter end. In response to receiving the message, the user may choose to resubmit the tag submission or respond to the message with additional information that may aid in identifying the content (e.g., the name of a television program).

In step 604, one or more filters may optionally be applied to the data. Specifically, the data may be filtered to determine whether the user's uploaded data should be added to the body of metadata that is stored for the particular piece of content. For example, a filter may be applied to determine whether data is appropriate (e.g., whether data includes undesirable language or images). In some examples, whether data is appropriate may vary depending on a rating (e.g., G, PG, PG-13, R, etc.) of the identified content. Therefore, filters for G-rated content may flag any data that includes any "bad" language or images, which would go unflagged through filters for R-rated content. Another example of a filter may include a filter to determine whether the data is relevant. That is, filters may be generated to analyze the data to determine whether it pertains to the content that it purports to be related to. Such a filter may search the data for words that match a list of expected words or similar words to other metadata for the same content that has already been supplied. Additionally, or alternatively, such a filter may analyze the data to determine whether it is known spam. Yet another filter may determine whether the data is a duplicate. It is contemplated that many users may submit data, and therefore, it is recognized that users may submit the same data. To avoid or reduce the occurrence of duplicate metadata, the second screen experience computing device 340 may implement a filter that analyzes previously and/or simultaneously submitted data to determine if the data is a duplicate. Duplicate data may also be the result of multiple occurrences of the same event within the same content. For example, an actress may wear the same shoes in different scenes, and thus, users may submit the same data for different scenes. The filter used to prevent or reduce duplicates may distinguish whether the duplicate is for the same segment of content. For example, the filter may allow duplicate data when the data pertains to different segments, but may flag duplicate data that is for the same segment of the same content. In some embodiments, where filters flag certain data, one or more authorized personnel may be tasked with reviewing the flagged data and deciding whether to remove or keep the flags. In other words, there may be a task force or team of people for reviewing flagged data to determine which data is ultimately stored as metadata.

The above described filters are just a few examples of the many filters that may be applied to the data to control which metadata may be made accessible to second screen devices 302. Further, the present disclosure explains that filters may flag certain data. Flagging data may include setting a value (e.g., a flag) of a memory cell associated with the data to '1.' Alternatively, instead of flagging data, the filters may delete the data from a storage area (e.g., a cache) where the data that is received in step 601 may be temporarily stored.

Next, at step 605, the second screen experience computing device 340 may determine whether a metadata tag submission should be accepted into storage for storing metadata based on the results of the filtering. Where flags are used to mark data, determining whether a metadata tag submission should be accepted may comprise checking whether flags exist for the data. For example, if the data is flagged, then the corresponding metadata tag might not be stored. Alternatively, where filters delete certain data that does not pass, then determining whether the metadata tag submission should be accepted may be performed by determining if the associated data still exists in a temporary storage area. If the metadata tag submission is not accepted (No at step 605), the method may end. In this case, the metadata tag corresponding to the metadata tag submission received at step 601 might not be stored on the second screen experience computing device 340. In some embodiments, the sender of the tag submission may be notified that the tag submission was denied in a similar manner that a notification is sent when content cannot be identified.

On the other hand, if the tag submission is accepted, e.g., the data passes the filtering (Yes at step 605), the method may proceed to step 606. In step 606, the corresponding metadata tag may be stored so that the content identified in step 602 may be tagged with the data received in the tag submission. Storing the metadata tag may include storing the data in association with a time point of the identified content. The time point may correspond to the time within the content that matches the audio profile that was included within the submission. For example, if the audio profile represents a five second audio clip occurring ten minutes into a television program, the metadata associated with that audio profile may be associated with a time point referencing the ten-minute mark of the television program. In some examples, when determining the time point of the content to tag, the method may consider that there may be a delay between the time when the user consumes an event and when the user triggers the generation of the audio profile. In recognition of such a delay, the method may tag the content at a point in time preceding the time represented by the audio profile by a predetermined interval (e.g., ten seconds). Alternatively, instead of associating the tag with a specific time point, the tag may be associated with a segment of the content. For example, a half-hour television show may be divided into six five-minute time segments, and if the audio profile is determined to represent a time point of eight minutes into the television show then the tag may be associated with the second segment (e.g., the segment between five minutes and ten minutes).

In some embodiments, the second screen experience computing device 340 may transmit a confirmation message to the user who sent the metadata tag submission to ask the user to confirm the time point of the metadata tag submission. In response to the confirmation message, a user may modify the time point thereby fine-tuning the association of the metadata to the time point in the content. The user may also modify the information in the metadata tag. In some examples, the confirmation message may include an image showing a screen shot (or frame) from the content at the time point that the metadata tag will be associated with. Thus, a user may view the image and determine whether the time point of the metadata tag is correct. Alternatively, or additionally, the confirmation message may include an audio clip corresponding to the audio profile that was received so that the user may listen to the audio clip to determine whether the time point of the metadata tag is correct.

In some embodiments, storing a metadata tag at step 606 may include editing a previous metadata tag. For example, if the time point of the metadata tag to be generated coincides with a pre-existing metadata tag, then the method may modify the pre-existing tag to include the newly submitted metadata. That is, editing or modifying a tag may include combining metadata from a pre-existing tag and the metadata most recently acquired and associating the combined metadata with the same time point in the content.

Additionally, the method may also include step 607 for ranking the metadata tags. In some embodiments, one or more of the metadata tags for the identified content may be ranked so that higher ranked metadata tags are displayed on a second screen device 302 before lower ranked metadata tags. In some examples, metadata tags are only ranked if more than one metadata tag exists for the same time point or segment in a particular piece of content. In this case, the ranking of the metadata tags may be relative among the metadata tags that pertain to the same time point or segment.

Ranking may be based on the user who is responsible for generating the metadata tag. In particular, the ranking may be based on a user's previous metadata tag submissions. For example, a metadata tag may be ranked higher because the user who generated the metadata tag submission previously sent a plurality of metadata tag submissions that were approved. Alternatively, or additionally, the ranking may be based on a user's profile. Certain users may be more credible than others, and therefore, metadata tag submissions from such users may be ranked higher. Also, user profiles may indicate that certain users have been given priority. For example, users associated/affiliated with a content provider or content creator may be given priority such that metadata tags created by such users are given higher rankings. User profiles may assist in identifying which users are affiliated with a content provider or content creator so that such prioritization scheme can be implemented. Metadata tags from advertisers and marketing companies may also be given higher priority. Similarly, metadata tags created by select individuals (e.g., friends, family, celebrities, etc.), who may be identified as described above, may be given higher priority as well.

In some embodiments, ranking of metadata tags may be done by other users viewing the metadata tags on second screen devices 302. Specifically, users may assist in ranking the metadata tags by rating the metadata tags. If a user "likes" a metadata tag, the metadata tag's ranking may improve, whereas if a user "dislikes" a metadata tag, the metadata tag's ranking may be lowered. In this manner, the crowd may be used to rank the metadata tags so that more relevant, desirable, and/or helpful metadata tags are ranked higher than others.

The above methods describe example methods for leveraging individual users, or a crowd of users, to acquire supplemental information and generating metadata tags based on the supplemental information. The following provides examples as to how these metadata tags may be provided to and displayed on second screen devices 302. An example method is described with reference to FIG. 7.

Figure 7:
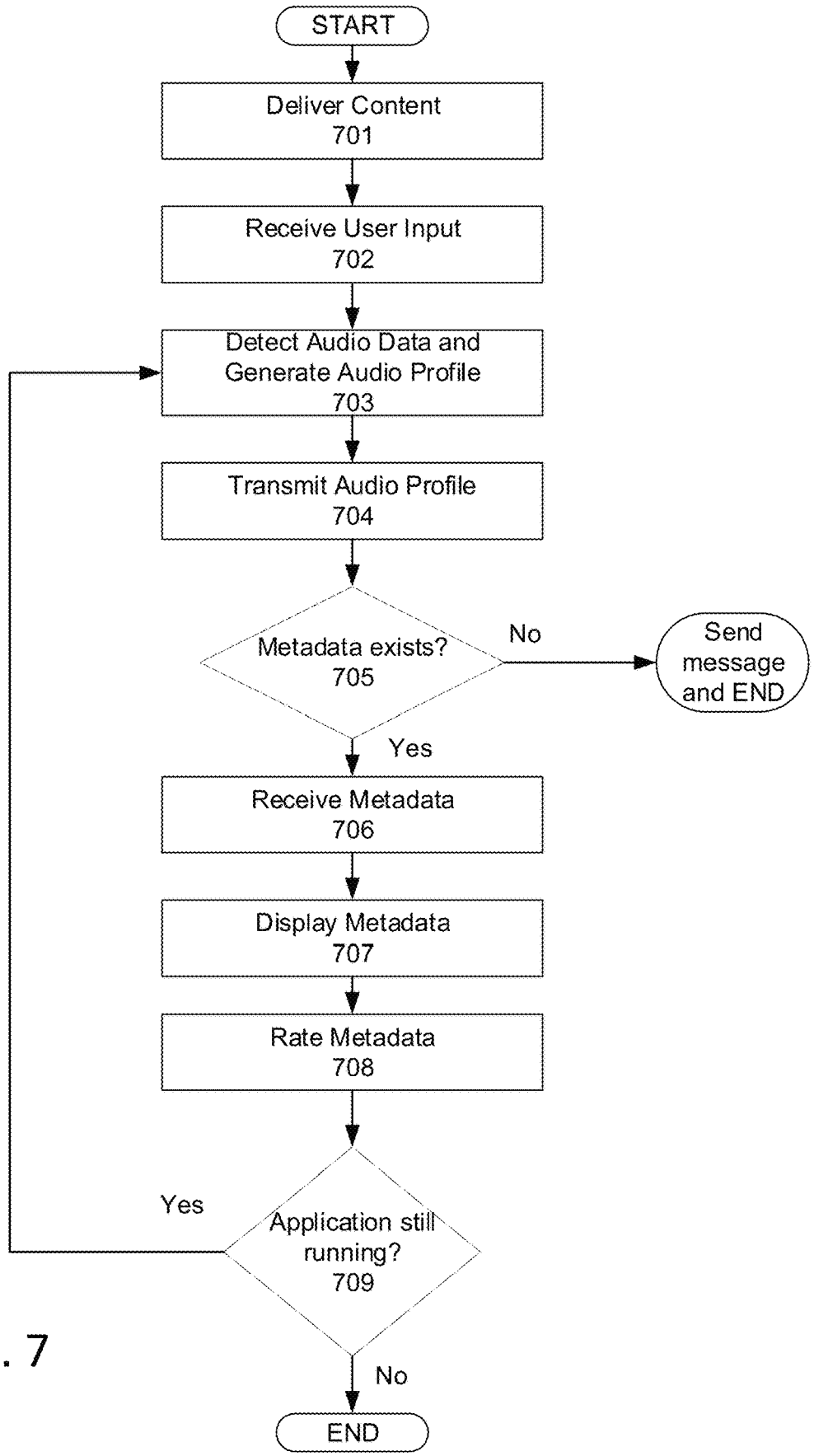
FIG. 7 is a flow diagram illustrating an example method according to one or more aspects of the disclosure.
Figure 8:
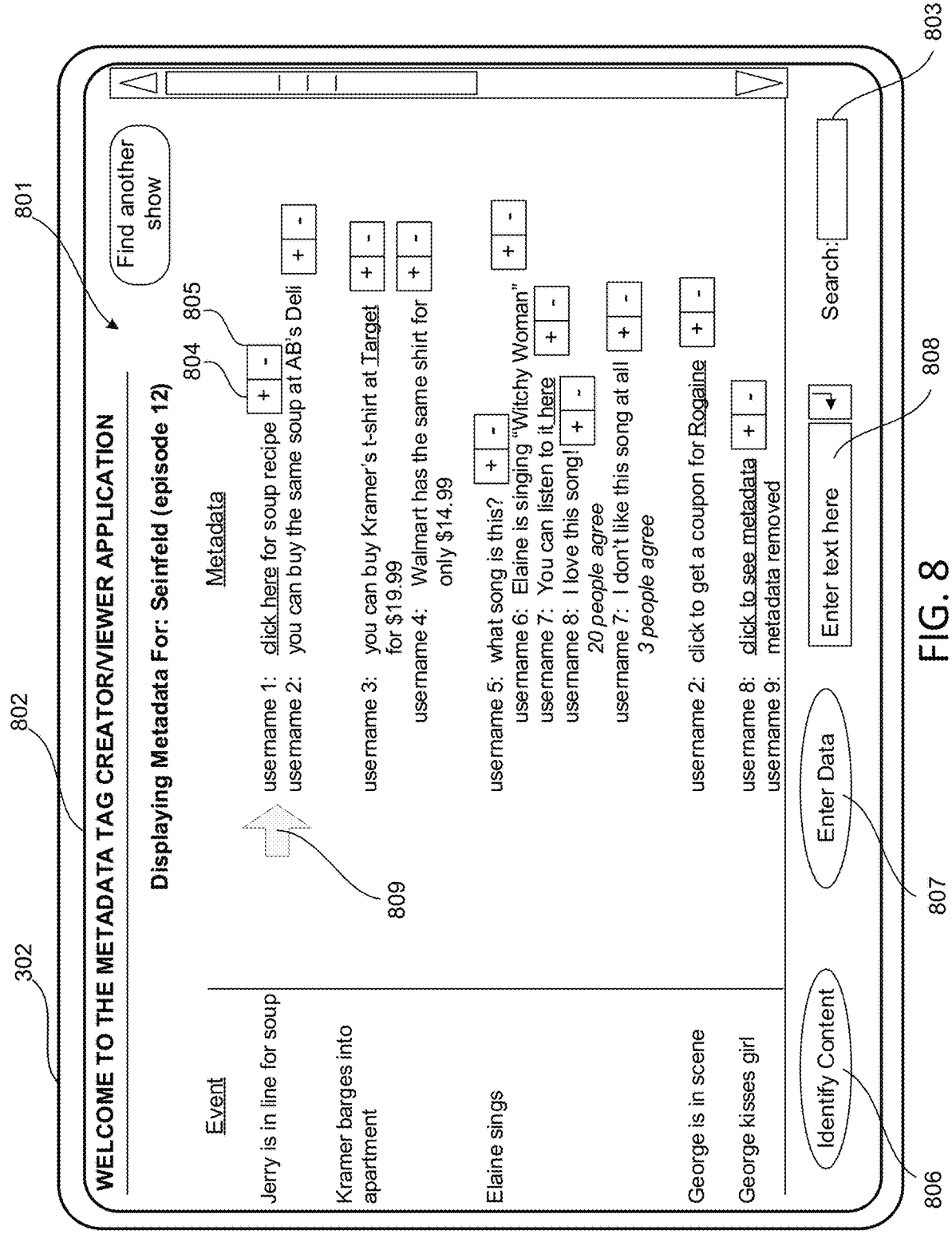
FIG. 8 is a diagram illustrating an example embodiment according to one or more aspects of the disclosure.

FIG. 7 begins with step 701 in which content is delivered for presentation (or otherwise provided) to a first screen device 301. When content is delivered or accessed for the first time, there might not be any metadata tags. However, when the content is delivered again (e.g., when the content is video on demand (VOD) content, a rerun, or otherwise time shifted), metadata tags generated by previous users of the content may be available for users to consume (e.g., view) with second screen devices 302. So, for example, a user may load or access supplemental information on a second screen device 302, where the supplemental information comprises the various user comments and metadata that have been entered and uploaded for the content that the user is about to watch. FIG. 8, discussed further below, illustrates an example of this. Thus, when content is delivered or accessed at step 701 after having been previously provided at least once, metadata tags associated with the content may be obtained. The more times content is streamed, the more likely it may be that people have provided metadata for the content. Further, in some cases, content creators, content providers, or other authorized persons or organizations may generate some metadata for content before it is made publically available, so that users consuming the content for the first time may also have supplemental information to access with their second screen devices 302. That is, metadata may be available before the content is delivered for the first time, and users consuming the content may add to or modify what is already available.

While content is delivered in step 701, a user may power up a second screen device 302 and initiate an application on the second screen device 302 that is configured to allow the second screen device 302 to receive metadata from the second screen experience computing device 340 (or another device). Specifically, a processor of the second screen device 302 may run the application. The application may generate a user interface on the second screen device 302 to allow a user to input a command at step 702 when the user of the second screen device 302 wishes to view supplemental information. In response to receiving the user input in step 702, the second screen device 302 may detect and generate an audio profile at step 703 of the content being delivered to the first screen device 301 so that metadata related to the content may be retrieved without the user having to provide other information to identify the content. In addition to supplying a command at step 702, a user may also specify the types, genre, authors, etc. of metadata tags that he/she desires to view. Steps 702 and 703 may, in one aspect, be performed in a similar manner as steps 502 and 503 of FIG. 5, respectively to generate an audio profile representing the content being consumed.

Next, at step 704, a request for metadata may be transmitted. For example, the second screen device 302 may generate and transmit a request for metadata related to the content being consumed. Specifically, the request for metadata may include the audio profile generated in step 703. Thus, the audio profile may be transmitted from the second screen device 302 to a server (e.g., the second screen experience computing device 340) configured to evaluate the audio profile to identify content based on the audio profile. At step 705, the second screen experience computing device 340 may identify the content being streamed based on the audio profile captured in step 703. Further, in step 705, the second screen experience computing device 340 may determine whether metadata tags exist for the identified content. In some cases, the second screen experience computing device 340 may specifically search for metadata tags associated with the segment of the content related to the audio profile. As also discussed above, the identification of the program may be done without using audio sampling and/or generating an audio profile. For example, the user may simply view a program schedule or program listing on the second screen device 302, and select one to identify it to the computing device 340. If the user used the second screen device 302 to initiate playback of the content in the first place (e.g., using a device 302 that is paired to control a DVR or STB, or to request a VOD session), the second screen device 302 may determine from this selection what content is being presented on the first screen device 301.

In some embodiments, the second screen experience computing device 340 may respond to the transmission in step 704 by providing the metadata for any existing metadata tags or by providing a message indicating that one or more metadata tags exist, and thus, the determination in step 705 may be performed by the second screen device 302 itself.

If metadata tags do not exist (No at step 705), the second screen experience computing device 340 may send a message indicating that no metadata tags exist to the transmitting second screen device 302. However, if metadata tags do exist, the metadata of the corresponding metadata tags may be received at step 706. The received metadata tags may be ranked in a particular order based on, for example, a user profile associated with the receiving second screen device 302 and/or priority levels of users who generated the metadata. In some cases, the received metadata may only include the metadata associated with the audio profile sent to the server. In other cases, the received metadata may be some portion or all of the metadata from a time period in the content starting with the audio profile sent to the server. Still in other cases, the audio profile may simply be used for identification of the content, and might not control what metadata is displayed. In any event, the received metadata may then be displayed at step 707. As discussed above, in some embodiments, the user of the second screen device 302 receiving the metadata may choose which metadata to display. Such selections may be used in ranking the metadata in subsequent accesses of the data as described above. For example, a user's selection of a particular metadata may increase that metadata's ranking such that it appears higher in a list of available metadata when the same user or another user subsequently receives the metadata.

After displaying the supplemental content, in some embodiments, the user of the second screen device 302 may rate the metadata at step 708. For example, the user may select whether the user "likes" or "dislikes" the metadata. Such selections may also be used in ranking the metadata in subsequent accesses of the data as described above.

At step 709, the process of FIG. 7 may determine whether the application is still running. If not, the process of FIG. 7 may end. However, if it is still running, the process may loop back to step 703 to process another piece of audio. By intermittently (periodically) detecting audio profiles at step 703, the synchronization of the metadata tags displayed on the second screen device 302 with the content provided on the first screen device 301 may be achieved. Further, steps of FIG. 7 may be repeated so that a user may view metadata for various content or segments of content streamed on the first screen device 301. Notably, the content being streamed may change, and thus, the audio profile detected in a subsequent implementation of step 703 may be for different content than the previous implementation of step 703. In some cases, a user of the second screen device 302 may trigger the detection of audio profiles at step 703. For example, when a user knows that he/she has switched channels, the user may instruct the application to detect a new audio profile (i.e., proceed to step 703) so that he/she may view the metadata associated with the content currently provided on the first screen device 301.

FIG. 8 illustrates a diagram of an example screen 801 of an application configured to allow a user to view metadata on a display 802 of a second screen device 302. As shown in FIG. 8, the screen 801 may display metadata for a particular piece of content. In this case, the screen 801 shows example metadata for a particular episode of the television show Seinfeld. A user of the application may choose the episode for which he/she wants to view metadata. Such a selection may be performed by detecting an audio profile from audio of content streaming on a first screen device 301 as described above with respect to step 703. Alternatively, or additionally, the selection may be made by selecting from a list of available content that has existing metadata. Also, the application may have a search box 803 that allows users to search for a particular piece of content.

Once content is chosen, the screen 801 may display the metadata for that content. The metadata may be displayed in a variety of ways. For example, the metadata may be displayed in chronological order according to the time point or segment of the content that the metadata corresponds to. In other words, referring to FIG. 8, if the event "Jerry is in line for soup" occurs within the Seinfeld episode before the event "Elaine sings," then the metadata generated by username1 and username2 for the "Jerry is in line for soup" event may be displayed first. As shown in FIG. 8, there may be more than one piece of metadata content for each event. In such cases, the metadata may be ordered in various ways as well. For example, the metadata may be ordered based on relevance so that more relevant pieces of metadata appear above less relevant pieces. Here, relevance may be determined manually by, for example, an administrator, or automatically based on the viewing user's profile or based on a priority level of the users that submitted the data. As shown in FIG. 8, the author/creator of the metadata may be identified by, for example, a username (e.g., username 1, username 2, etc.). Each username may be assigned a priority level, and therefore, metadata created by a person having a username with a higher priority may appear above metadata created by a person having a username with a lower priority. Referring to FIG. 8, username 1 may have a higher priority level than username 2, and as such, the metadata of username 1 may appear above the metadata of username 2. As explained herein, the priority levels for usernames may be established based on various factors, including how frequently a username enters metadata or whether others approve of other metadata entered by a username. In some embodiments, higher priority levels may be given to preferred usernames, such as those associated with companies that wish to have their metadata appear higher in the list. Also, while FIG. 8 shows that metadata may be displayed in chronological order, in other examples, the metadata may be displayed on the basis of priority level alone. Still in other cases, as explained herein, users may control which metadata is displayed using filters and/or by providing a profile for the system to utilize in determining which metadata a user might be interested in. Further, the display may be modified based on a search of the metadata using, for example, the search box 803. The application may also be configured to allow a user of the second screen device 302 to re-order the metadata tags. For example, the user may click and drag the metadata submitted by username3 related to Kramer's t-shirt to the top of the list because Kramer is wearing that t-shirt at an earlier time in the episode.

FIG. 8 also illustrates that the application may allow users to comment on (or reply to) metadata created by others. For example, username4 may comment on metadata generated by username3 to provide another place where an item may be purchased. The application may permit users to respond to other users' metadata in this manner by allowing them to select on the metadata they wish to respond to and prompting them with a metadata entry form similar to the form shown in FIG. 4G. Yet another feature of the application may be that users can rate metadata generated by other users. For example, a user having username1 may select a "like" or "agree" icon 804 appearing next to metadata created by username8 Meanwhile, another user having username2 may select a "dislike" or "disagree" icon 805 appearing next to metadata created by username8 In some examples, the results of feedback from other users (e.g., how many people agree and/or how many people disagree) may be displayed on the screen 801. Further, in some embodiments, when a predetermined number of "dislikes" or "disagrees" are submitted in response to a single piece of metadata, that metadata may be removed or otherwise hidden. Therefore, if inappropriate metadata is submitted (e.g., X-rated content or X-rated language), other users may prevent that metadata from being displayed. As a result, "the crowd" may police the metadata content displayed by the application. This result is illustrated in FIG. 8 which shows that metadata submitted by username8 is hidden so that it can only be accessed via a link, and which shows that metadata submitted by username9 is removed. Where the metadata is hidden such that it is only accessible via a link, whether the link can be followed may depend on a user's profile, which may indicate a user's age.

The crowd may also be leveraged to improve the quality of the metadata. For example, where metadata is spoiled (e.g., includes a web link that is no longer available, inaccurate, irrelevant, or otherwise undesirable), the application displaying the metadata may be configured to allow the crowd to remove the metadata. In some examples, to prevent any one person from having too much control over the metadata, a certain number of removal requests may be required before the metadata is actually removed. Additionally, or alternatively, to address concerns about spoiled web links a web crawler may be utilized to confirm whether web links still exist. Moreover, the web crawler may also evaluate the web links to determine whether the web links still show related metadata. Furthermore, when metadata is determined to be spoiled, the system (e.g., the second screen experience computing device 340) may notify the creator of the spoiled metadata tag. Given this notice, the creator may choose to re-tag the metadata or edit the metadata tag (e.g., provide a new web link).

Although the above description explains that the crowd may be leveraged to police the quality of metadata, it is also contemplated that one or more administrator(s) of the system may have the authority to review the metadata tags as well. For example, an administrator may remove duplicates, delete inappropriate metadata, and update metadata if it is spoiled.

FIG. 8 further illustrates that the application may allow users to initiate the generation of metadata tags from the screen 801 showing already submitted metadata tags. Specifically, the user may select any of options 806, 807, and 808. In different embodiments, different options 806, 807, and 808 may be available. By selecting option 806, a user may initiate identification of the content, for example, by processing audio of the content to detect an audio profile which can be used for comparison with audio files or audio profiles of known content. This may then result in a time point of the content being tagged, and allow the user to enter metadata for the tag in a manner similar to that shown in FIG. 4F. On the other hand, when a time point or segment of the content is already identified (e.g., in a case where audio is continuously processed), a user may select option 807 thereby triggering a metadata entry form (like the one shown in FIG. 4G) to be displayed. The user may then complete the metadata entry form and submit it. Once submitted, the metadata tag may then appear in the listing shown on FIG. 8 so that the user can see his/her submission. Additionally, or alternatively, option 808 may include a text box in which a user may enter text. When the user begins to enter text and/or submits the text, the application may capture a time point for the content so that the text can be added into the listing at the appropriate place in chronological order. Another option (not illustrated) for entering metadata while viewing the listing of metadata tags shown on the screen 801 of FIG. 8 may include allowing the user to click a location on the screen 801 into which he/she wishes to add metadata. In other words, the application may generate a dialog box similar to the dialog box 403 of FIG. 4H when a user clicks on a portion of the screen 801 and receive the metadata through the dialog box. Once the metadata is submitted through the dialog box, the application may then insert the metadata tag into a position of the listing where the user clicked. In this manner, the metadata entered in the dialog box may be associated with a time point of the content based on its relationship (e.g., relative order) to other metadata tags in the listing that are already associated with time points of the content.

It should be understood that the screen 801 of FIG. 8 is an example intended to aid understanding of the present disclosure. In some embodiments, the screen 801 might not show the events (e.g., "Jerry is in line for soup," "Kramer barges into apartment," etc.), and instead, simply show the metadata in chronological order. Where the events are shown, they may be defined by the content creators (e.g., the producers of Seinfeld) or some other administrator(s) who has undertaken the task of identifying events throughout the content. Also, rather than including text to describe events, the events may be represented by images, audio, video, etc.

Further, the application may be synchronized with content streaming on a first screen device 301 so that the metadata displayed on the screen 801 may correspond to the particular segments or time points of the content streaming on the first screen device 301. For example, when the portion of the Seinfeld episode where Jerry waits in line for soup is streamed on the first screen device 301, only the corresponding metadata generated by username1 and username2 may be shown. Alternatively, additional metadata for other segments of the content (e.g., metadata corresponding to when Elaine sings) may be shown, but may appear below the corresponding metadata generated by username1 and username2. Further, a feature of the application may be to display different metadata as the streaming content changes, add metadata as the streaming content changes, move an icon (e.g., arrow 809) to point to different metadata as the streaming content changes, highlight different metadata as the streaming content changes, or to automatically scroll down a list of metadata as the streaming content changes. To accomplish this task, the application may process audio of the content streaming on the first screen device 301 to identify a starting point and may assume that the streaming content continues to stream. Using such a starting point, the application may determine an approximate time when the user is viewing certain events, and thus, may display corresponding metadata. In some embodiments, the application may continuously or periodically process audio from the content streaming on the first screen device 301 to synchronize the metadata with the streaming content.

Figure 9:
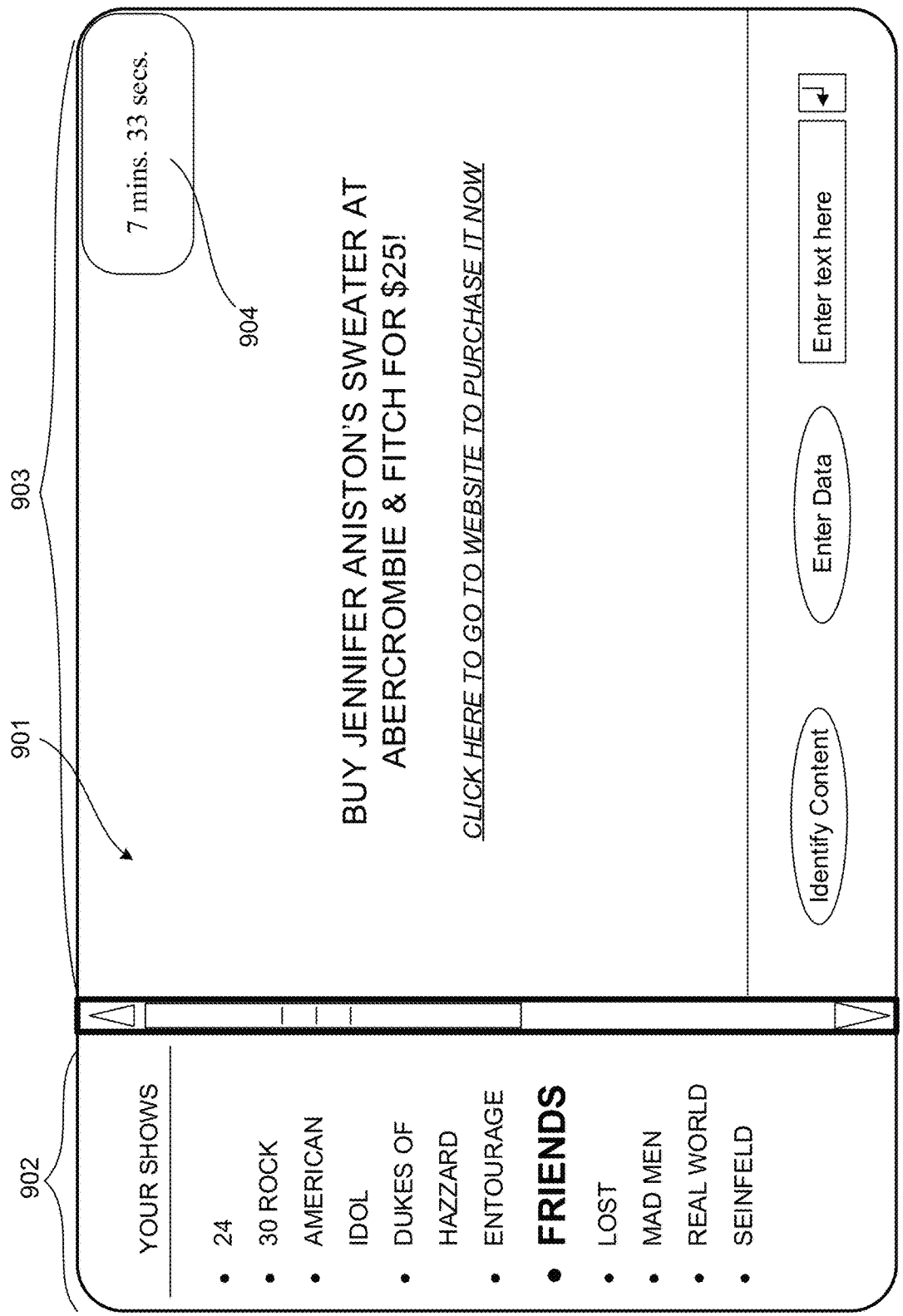
FIG. 9 is a diagram illustrating another example embodiment according to one or more aspects of the disclosure.

FIG. 9 illustrates another embodiment for displaying metadata on a screen 901 of a second screen device 302. As shown in FIG. 9, a left frame 902 of the screen 901 may display a listing of content (e.g., television shows, movies, videos, etc.). The listing of content may be recently watched content, favorite content of a user of the second screen device 302, or all for which metadata exists. In some cases, the content listing may include statistics beside each content named in the listing showing how many metadata tags exist for that content. Additionally, or alternatively, the left frame 902 may include statistics indicating which friends, family members, or other specified individuals have commented on which content. Thus, a user can identify and navigate to metadata generated by specific individuals. The left frame 902 may also indicate which content is being streamed on a near-by first screen device 301 and/or for which piece of content metadata is currently being displayed in a right frame 903 of the screen 901. For example, the television show "Friends" in the left frame 902 of FIG. 9 is highlighted indicating that metadata for "Friends" is being shown in the right frame.

Meanwhile, FIG. 9 also shows an example of metadata that might be shown in the right frame 903. The metadata shown in the right frame 903 may change as the content provided on the first screen device 301 is played back. Specifically, the metadata shown in the right frame 903 may be synchronized with a time point or segment of the content on the first screen device 301 so that when a particular time point or segment of the content on the first screen device 301 is played back, the corresponding metadata may pop-up in the right frame 903 of the screen 901. To facilitate synchronization, the second screen device 302 may detect the particular time point or segment by continuously recording audio from the content on the first screen device 301 and analyzing the recording (e.g., detecting an audio profile). Using audio recognition processes, the second screen device 302 may determine a point in time of the content. Then, the second screen device 302 may compare the determined point in time to time points associated with metadata for the content to determine when and what metadata to display.

Alternatively, instead of continuously recording audio or continuously processing audio from the content to detect audio profiles, the second screen device 302 may intermittently (e.g., periodically) detect an audio profile and use the audio profile to identify a time within the content as a reference point. Then, the second screen device 302 may use a clock to keep track of time in relation to the reference point. For example, from an audio profile detected by the second screen device 302, the second screen device 302 may determine that the content on the first screen device 301 is five minutes into the content. The second screen device 302 may then use a clock to keep track of time from that point on so that the second screen device 302 may determine when the user is 7 minutes and 33 seconds into the content at which point it may display corresponding metadata in the right frame 903 of the screen 901. In some cases, the screen 901 may include a clock 904 showing a running time of the content. This clock may allow the user to assist in synchronizing the content. Specifically, if the user suspects that the time of the clock 904 does not match the time of the content, then the user may choose to detect a new audio profile, for example, by selecting a button (e.g., the identify content option).

As explained above, FIG. 9 shows that different metadata may pop-up on the screen 901 in synchronization with content provided on a first screen device 301. In some cases, a particular piece of metadata may be displayed on the screen 901 until the next metadata tag is reached. If there are many metadata tags, the second screen device 302 may regulate how frequently the metadata changes so that the metadata can be viewed. Also, in some cases, advertisements or other information may be shown in between different metadata tags.

Further, while FIG. 9 illustrates metadata corresponding to the television show "Friends," it should be understood that metadata associated with a commercial being displayed on the first screen device 301 may also pop-up on the second screen device. For example, when a commercial for a car is provided on the first screen device 301, metadata associated with the commercial (e.g., a website of a local dealer selling the car, a video of the car, etc.) may pop-up onto the screen 901 of the second screen device 302.

It should be understood from the description herein that synchronization may be more readily accomplished because timestamps may be determined when creating the metadata tag submissions. Further, even though not all metadata in any one embodiment may be synchronized, synchronization of even a small portion of the metadata may be desirable.

Additionally, another aspect of the disclosure is to provide a method and system for content creators, content providers, and/or advertisers to view what others (e.g., the "crowd") are saying about their content, services, and/or products. Such advertisers, for example, may be permitted to add and/or present information related to their product or services (subject to any filters). As described above, users may control their second screen devices 302 to filter out metadata so that they may only view metadata they are interested in. Similarly, content creators, content providers, advertisers, etc. may be able to use devices (e.g., second screen devices 302) to filter metadata created by the crowd to view metadata they are interested in. For example, a store may filter metadata associated with one or more pieces of content to view metadata that mentions its name or includes a web link to its website.

Although example embodiments are described above, the various features and steps may be combined, divided, omitted, and/or augmented in any desired manner, depending on the specific secure process desired. For example, FIG. 7 may be modified so that a user inputs information identifying content for which the user wishes to view metadata instead of detecting an audio profile in step 703 and transmitting the audio profile in step 704. This patent should not be limited to the example embodiments described, but rather should have its scope determined by the claims that follow.

The invention claimed is:

1. A method comprising:
receiving, by a computing device and from a user device:
a sample of audio indicating a time point associated with a portion of primary content that is being presented;
user-provided data; and
a request to associate the user-provided data with the time point;
determining, by the computing device and based on the sample of audio, a content portion from the primary content;
sending, by the computing device and to the user device, the content portion;
receiving, by the computing device and from the user device, a message confirming an association between the content portion and the user-provided data; and
generating, by the computing device, metadata that associates the user-provided data with the content portion.

2. The method of claim 1, wherein the user-provided data comprises a user comment.

3. The method of claim 1, wherein the user-provided data comprises a user comment, the method further comprising:
comparing textual data of the user comment with a predetermined word;
discarding a portion of the textual data that corresponds to the predetermined word; and
causing one or more other user devices to display a remaining portion of the textual data with the content portion.

4. The method of claim 1, further comprising:
receiving, by the computing device and from the user device, genre information for the user-provided data;
associating, by the computing device, the genre information with the metadata that associates the user-provided data with the content portion; and
causing, based on the genre information, one or more other user devices to display the metadata associated with the genre information.

5. The method of claim 1, further comprising:
determining, by the computing device and based on one or more filter criteria, whether to reject the request to associate the user-provided data with the time point.

6. The method of claim 1, wherein the generating metadata comprises adding the user-provided data to a plurality of additional user-provided data items previously associated with the content portion.

7. The method of claim 1, wherein the user-provided data comprises a user-provided link, the method further comprising:
sending, by the computing device and to one or more user devices, the user-provided link along with the content portion.

8. The method of claim 1, wherein:
the determining the content portion from the primary content comprises identifying a playback time within the primary content; and
the metadata associates the user-provided data with the identified playback time.

9. A system comprising:
a computing device; and
a user device;
wherein the computing device comprises:
one or more first processors; and
memory storing first instructions that, when executed by the one or more first processors of the computing device, cause the computing device to:

receive, from the user device:
  a sample of audio indicating a time point associated with a portion of primary content that is being presented;
  user-provided data; and
  a request to associate the user-provided data with the time point;
determine, based on the sample of audio, a content portion from the primary content;
send, to the user device, the content portion;
receive, from the user device, a message confirming an association between the content portion and the user-provided data; and
generate metadata that associates the user-provided data with the content portion; and
wherein the user device comprises:
  one or more second processors; and
  memory storing second instructions that, when executed by the one or more second processors of the user device, cause the user device to:
    send the sample of audio, the user-provided data, and the request to associate the user-provided data with the time point; and
    send the message confirming the association between the content portion and the user-provided data.

10. The system of claim 9, wherein the user-provided data comprises a user comment.

11. The system of claim 9, wherein the user-provided data comprises a user comment and the first instructions, when executed by the one or more first processors of the computing device, further cause the computing device to:
  compare textual data of the user comment with a predetermined word;
  discard a portion of the textual data that corresponds to the predetermined word; and
  cause one or more other user devices to display a remaining portion of the textual data with the content portion.

12. The system of claim 9, wherein the first instructions, when executed by the one or more first processors of the computing device, further cause the computing device to:
  receive, from the user device, genre information for the user-provided data;
  associate the genre information with the metadata that associates the user-provided data with the content portion;
  cause, based on the genre information, one or more other user devices to display the metadata associated with the genre information.

13. The system of claim 9, wherein the first instructions, when executed by the one or more first processors of the computing device, further cause the computing device to:
  determine, based on one or more filter criteria, whether to reject the request to associate the user-provided data with the time point.

14. The system of claim 9, wherein the first instructions, when executed by the one or more first processors of the computing device, cause the computing device to generate the metadata by adding the user-provided data to a plurality of additional user-provided data items previously associated with the content portion.

15. The system of claim 9, wherein the user-provided data comprises a user-provided link, and the first instructions, when executed by the one or more first processors of the computing device, further cause the computing device to:
  send, to one or more user devices, the user-provided link along with the content portion.

16. The system of claim 9, wherein:
  the first instructions, when executed by the one or more first processors of the computing device, cause the computing device to determine the content portion from the primary content by identifying a playback time within the primary content; and
  the metadata associates the user-provided data with the identified playback time.

17. A non-transitory computer-readable medium storing instructions that, when executed, cause a computing device to:
  receive, from a user device:
    a sample of audio indicating a time point associated with a portion of primary content that is being presented;
    user-provided data; and
    a request to associate the user-provided data with the time point;
  determine, based on the sample of audio, a content portion from the primary content;
  send, to the user device, the content portion;
  receive, from the user device, a message confirming an association between the content portion and the user-provided data; and
  generate metadata that associates the user-provided data with the content portion.

18. The non-transitory computer-readable medium of claim 17, wherein user-provided data comprises a user comment.

19. The non-transitory computer-readable medium of claim 17, wherein user-provided data comprises a user comment and the instructions, when executed, further cause the computing device to:
  compare textual data of the user comment with a predetermined word;
  discard a portion of the textual data that corresponds to the predetermined word; and
  cause one or more other user devices to display a remaining portion of the textual data with the content portion.

20. The non-transitory computer-readable medium of claim 17, wherein the instructions, when executed, further cause the computing device to:
  receive, from the user device, genre information for the user-provided data;
  associate the genre information with the metadata that associates the user-provided data with the content portion;
  cause, based on the genre information, one or more other user devices to display the metadata associated with the genre information.

21. The non-transitory computer-readable medium of claim 17, wherein the instructions, when executed, further cause the computing device to:
  determine, based on one or more filter criteria, whether to reject the request to associate the user-provided data with the time point.

22. The non-transitory computer-readable medium of claim 17, wherein the instructions, when executed, cause the computing device to generate metadata by adding the user-provided data to a plurality of additional user-provided data items previously associated with the content portion.

23. The non-transitory computer-readable medium of claim 17, wherein the user-provided data comprises a user-provided link and the instructions, when executed, further cause the computing device to:
  send, to one or more user devices, the user-provided link along with the content portion.

24. The non-transitory computer-readable medium of claim 17 wherein:
- the instructions, when executed, cause the computing device to determine the content portion from the primary content by identifying a playback time within the primary content; and
- the metadata associates the user-provided data with the identified playback time.

\* \* \* \* \*